(12) United States Patent
Wali et al.

(10) Patent No.: US 12,155,685 B1
(45) Date of Patent: Nov. 26, 2024

(54) SYSTEM AND METHOD FOR IMPROVING CYBERSECURITY BY GENERATING ACTIVITY REPORTS USING MACHINE-LEARNING MODELS

(71) Applicant: Citibank, N.A., New York, NY (US)

(72) Inventors: Girish Wali, Irving, TX (US); Deepali Tuteja, Irving, TX (US); Prasanth Babu Madakasira Ramakrishna, Irving, TX (US); Brett Pickard, Irving, TX (US); Saketh Ram Gurumurthi, Irving, TX (US); Miriam Silver, Tel Aviv (IL)

(73) Assignee: CITIBANK, N.A., New York, NY (US)

( * ) Notice: Subject to any disclaimer, the term of this patent is extended or adjusted under 35 U.S.C. 154(b) by 0 days.

(21) Appl. No.: 18/769,872

(22) Filed: Jul. 11, 2024

(51) Int. Cl.
   *H04L 9/40* (2022.01)
   *H04L 67/10* (2022.01)

(52) U.S. Cl.
   CPC .......... *H04L 63/1425* (2013.01); *H04L 67/10* (2013.01)

(58) Field of Classification Search
   CPC ..................... H04L 63/1425; H04L 67/10
   See application file for complete search history.

(56) References Cited

U.S. PATENT DOCUMENTS

| | | | |
|---|---|---|---|
| 9,485,265 B1* | 11/2016 | Saperstein | G06F 16/24575 |
| 9,823,958 B2 | 11/2017 | Dryer et al. | |
| 2020/0184487 A1* | 6/2020 | Pandya | H04L 63/1441 |
| 2021/0295338 A1 | 9/2021 | Kreth et al. | |
| 2022/0078210 A1* | 3/2022 | Crabtree | G06F 16/9024 |
| 2023/0129964 A1 | 4/2023 | Rodriguez Bravo et al. | |
| 2023/0171274 A1* | 6/2023 | Muthuswamy | H04L 41/0866 726/22 |
| 2023/0297887 A1 | 9/2023 | Gurgu et al. | |
| 2023/0325498 A1* | 10/2023 | Whalen | G06F 21/566 726/23 |

* cited by examiner

*Primary Examiner* — El Hadji M Sall
(74) *Attorney, Agent, or Firm* — Foley & Lardner LLP

(57) ABSTRACT

Presented herein are systems and methods for generating suspicious activity reports using large language models. A system may include one or more processors that obtain event data associated with an event from a client device and from one or more databases, apply a prompt generator on the event data to generate a large language model (LLM) prompt, and generate a machine-readable suspicious activity (SAR) report in accordance with an LLM prompt. The one or more processors may also apply the prompt generator on the event data based on determining that a fraud risk score associated with the event satisfies a reporting threshold score. Computer program products are also presented.

20 Claims, 10 Drawing Sheets

600

Obtain input event data (e.g., cybersecurity event data, transaction data) associated with an event (e.g., cybersecurity event, transaction) from a client device (e.g., mobile device of an end-user) 602

↓

Extract input feature vector for the event using the input event data 604

↓

Query one or more databases for stored event data (e.g., historical transaction data, historical cybersecurity data, user data) using the feature vector for the transaction 606

↓

Execute prompt generator on the event data to generate an LLM prompt 608

↓

Execute an LLM to generate a machine-readable SAR based on the LLM prompt and the event data from the RAG model 610

SYSTEM AND METHOD FOR IMPROVING CYBERSECURITY BY GENERATING ACTIVITY REPORTS USING MACHINE-LEARNING MODELS

BACKGROUND

Some organizations are required to detect and report suspicious activities when complying with state and federal laws. For example, organizations can be required to report activities as suspicious where the activity involves payment over a statutorily or regulatorily defined amount. Additionally, they may be required to report activities where aspects of the activity itself indicate that it is suspicious. These organizations then rely on individuals to prepare and submit a suspicious activity report (SAR), an often time-consuming process that is prone to human error.

Once an activity is identified as potentially suspicious, individuals may be tasked with reviewing and analyzing information that may be related to the suspicious activity, the information stored across vast datasets. This conventional processes of appropriately identifying and aggregating information for SARs can be highly subjective. As a result, it can be difficult for a group of individuals preparing SARs to consistently identify all of the relevant information and capture that information in SARs. Often, there are many false positives and, according to certain research findings, as few as 4% of total SAR filing warrant a follow-up from law enforcement.

SUMMARY

Provided herein are systems and methods that improve on these conventional techniques by systematically identifying, aggregating, and incorporating relevant data when generating SARs. More specifically, artificial intelligence systems and techniques are provided that can identify and incorporate relevant information into SAR reports based on vast amounts of potentially disparate data. However, the use of artificial intelligence to generate SARs faces several technical challenges. First, training an artificial intelligence model to generate SARs requires detailed, high-quality datasets about current and historic events, behaviors, and patterns, which may be unavailable, incomplete, inaccurate, or poorly labeled. Without these detailed, high-quality datasets the model may be ill-equipped to detect the nuances, subtle patterns, and/or anomalies in the data. Second, models need to be frequently updated and retrained to keep up with new patterns of suspicious activity, which can be resource-intensive and technically challenging. The technical problems are particular troublesome for large language models.

Systems and methods are described herein to overcome these challenges by mitigating the training burden when adapting an artificial intelligence-based solution to improving cybersecurity by generating SARs. For example, as opposed to relying solely on a detected cybersecurity event as an input to a model to generate a SAR, the system first performs an initial preprocessing step. In particular, the system combines the detected cybersecurity event with historical detected cybersecurity data having a threshold similarity to the detected cybersecurity event. The system then combines the detected cybersecurity event with historical detected cybersecurity data to generate composite data, which in turn is fed into a large language model to generate the SAR. By first determining similar historical data, and combining that historical data with the detected cybersecurity event, the system increases the amount of data input into the system. Thus, the large language model has more relevant information upon which to generate the SAR (and/or identify activities subject to the SAR). Moreover, as the relevant information has been "seeded" to the large language model, the large language model requires less overall training (and/or smaller training dataset) in order to detect the nuances, subtle patterns, and/or anomalies in the data. Likewise, new patterns of suspicious activity can be represented as the historic data changes; thus, preventing resource-intensive and technically challenging model re-training.

In embodiments, a non-transitory computer readable medium includes instructions for improving cybersecurity over cloud computing networks by generating suspicious activity reports (SARs) using retrieval-augmented generation (RAG) and large language models (LLMs). When executed by one or more processors, the instructions cause operations including: obtaining, over a cloud computing network, processing data associated with a cybersecurity event from a mobile device; extracting an input feature vector for the cybersecurity event using the processing data; querying, by executing a RAG model of a RAG engine, one or more databases for historical cybersecurity data using the input feature vector for the cybersecurity event, the historical cybersecurity data having a stored feature vector within a threshold distance from the input feature vector for the cybersecurity event, to composite cybersecurity event data based upon the historical cybersecurity data and the processing data; executing a prompt generator on the composite cybersecurity event data, the prompt generator trained to receive the composite cybersecurity event data from the RAG model as input and generate an LLM prompt as a first output using the composite cybersecurity event data from the RAG model; and generating, by executing an LLM, a machine-readable SAR based on the composite cybersecurity event data from the RAG model, the LLM trained to receive the LLM prompt from the prompt generator as input and generate the machine-readable SAR as a second output using the LLM prompt and the composite cybersecurity event data, the machine-readable SAR containing at least a portion of the composite cybersecurity event data in accordance with the LLM prompt generated by the prompt generator.

In embodiments, a computer-implemented method for improving cybersecurity generating suspicious activity reports (SARs) using retrieval-augmented generation (RAG) and large language models (LLMs), the computer-implemented method including: obtaining, by a computer, input event data (e.g., cybersecurity data, transaction data) associated with an event (e.g., cybersecurity event, transaction) from a client device; extracting, by the computer, an input feature vector for the event using the input event data; querying, by the computer executing a RAG model of a RAG engine, one or more databases for stored event data using the input feature vector for the event, the stored event data having a stored feature vector within a threshold distance from the input feature vector for the event, thereby obtaining event data based upon the stored event data and the input event data; executing, by the computer, a prompt generator on the event data, the prompt generator trained to receive the event data from the RAG model as input and generate an LLM prompt as output using the event data from the RAG model; and generating, by the computer executing an LLM, a machine-readable SAR based on the event data from the RAG model, the LLM trained to receive the LLM prompt from the prompt generator as input and generate the machine-readable SAR as output using the LLM prompt and the event data, the machine-readable SAR containing at least a portion of the event data in accordance with the LLM prompt generated by the prompt generator.

The method may include receiving, by the computer, an alert indicating that the event is a candidate suspicious event. The computer obtains the stored event data from the one or more databases in response to receiving the alert.

The method may include: identifying, by the computer executing a database persona of the RAG engine, the stored event data in the one or more databases; and extracting, by the computer, one or more types of data points from the stored event data according to one or more configurations of the database persona indicating the one or more types of data points.

The method may include generating, by the computer, a fraud risk score indicating a predicted likelihood of fraud associated with the event by executing a fraud prediction engine using a feature vector extracted using the event data. The computer executes the prompt generator in response to determining that the fraud risk score satisfies a reporting threshold score.

The method may include obtaining, by the computer executing a regulatory persona of the RAG engine, an update message from a database of the one or more databases indicating a reporting threshold score.

The method may include obtaining, by the computer executing a regulatory persona of the RAG engine, an update message from a database of the one or more databases indicating a content data type for content of the event data for the machine-readable SAR. The LLM executed by the computer generates the machine-readable SAR based upon the content data type of the event data.

The method may include generating, by the computer executing the regulatory persona of the RAG engine, a machine-readable template SAR file indicating the content data type. The LLM executed by the computer generates the machine-readable SAR as the machine-readable template SAR file having the event data.

Querying the stored event data associated with the event may include receiving, by the computer, user data associated with a user involved in the event from the one or more databases.

The method may include generating, by the computer, a unified RAG model based upon a plurality of machine-learning models of a plurality of personas.

In embodiments, a system may improve cybersecurity by generating suspicious activity reports (SARs) using retrieval-augmented generation (RAG) and large language models (LLMs). The system comprises a computer including at least one processor, configured to: obtain input event data (e.g., cybersecurity event data, transaction data) associated with an event (e.g., cybersecurity event, transaction) from a client device; extract an input feature vector for the event using the input event data; query, by a RAG model of a RAG engine, one or more databases for stored event data using the input feature vector for the event, the stored event data having a stored feature vector within a threshold distance from the input feature vector for the event, thereby obtaining event data based upon the stored event data and the input event data; execute a prompt generator on the event data, the prompt generator trained to receive the event data from the RAG model as input and generate an LLM prompt as output using the event data from the RAG model; and execute an LLM to generate a machine-readable SAR based on the event data from the RAG model, the LLM trained to receive the LLM prompt from the prompt generator as input and generate the machine-readable SAR as output using the LLM prompt and the event data, the machine-readable SAR containing at least a portion of the event data in accordance with the LLM prompt generated by the prompt generator.

The computer may be further configured to receive an alert indicating that the event is a candidate suspicious event. The computer obtains the stored event data from the one or more databases in response to receiving the alert.

The computer may be further configured to: identify, by executing a database persona of the RAG engine, the stored event data in the one or more databases; and extract one or more types of data points from the stored event data according to one or more configurations of the database persona indicating the one or more types of data points.

The computer may be further configured to generate a fraud risk score indicating a predicted likelihood of fraud associated with the event by executing a fraud prediction engine using a feature vector extracted using the event data. The computer executes the prompt generator in response to determining that the fraud risk score satisfies a reporting threshold score.

The computer may be further configured to obtain, by executing a regulatory persona of the RAG engine, an update message from a database of the one or more databases indicating a reporting threshold score.

The computer may be further configured to obtain, by executing a regulatory persona of the RAG engine, an update message from a database of the one or more databases indicating a content data type for content of the event data for the machine-readable SAR. The LLM executed by the computer generates the machine-readable SAR based upon the content data type of the event data.

The computer may be further configured to generate, by executing the regulatory persona of the RAG engine, a machine-readable template SAR file indicating the content data type. The LLM executed by the computer generates the machine-readable SAR as the machine-readable template SAR file having the event data.

When querying the stored event data associated with the event, the computer may be configured to receive user data associated with a user involved in the event from the one or more databases.

The computer may be further configured to generate a unified RAG model based upon a plurality of machine-learning models of a plurality of personas.

The computer may iteratively train a persona machine-learning model of a persona using intermediate outputs iteratively generated by the persona machine-learning model in accordance with a chain-of-thought training.

It is to be understood that both the foregoing general description and the following detailed description are exemplary and explanatory and are intended to provide further explanation of the embodiments described herein.

BRIEF DESCRIPTION OF THE DRAWINGS

The accompanying drawings constitute a part of this specification, illustrate one or more embodiments and, together with the specification, explain the subject matter of the disclosure.

DETAILED DESCRIPTION

Figure 1:
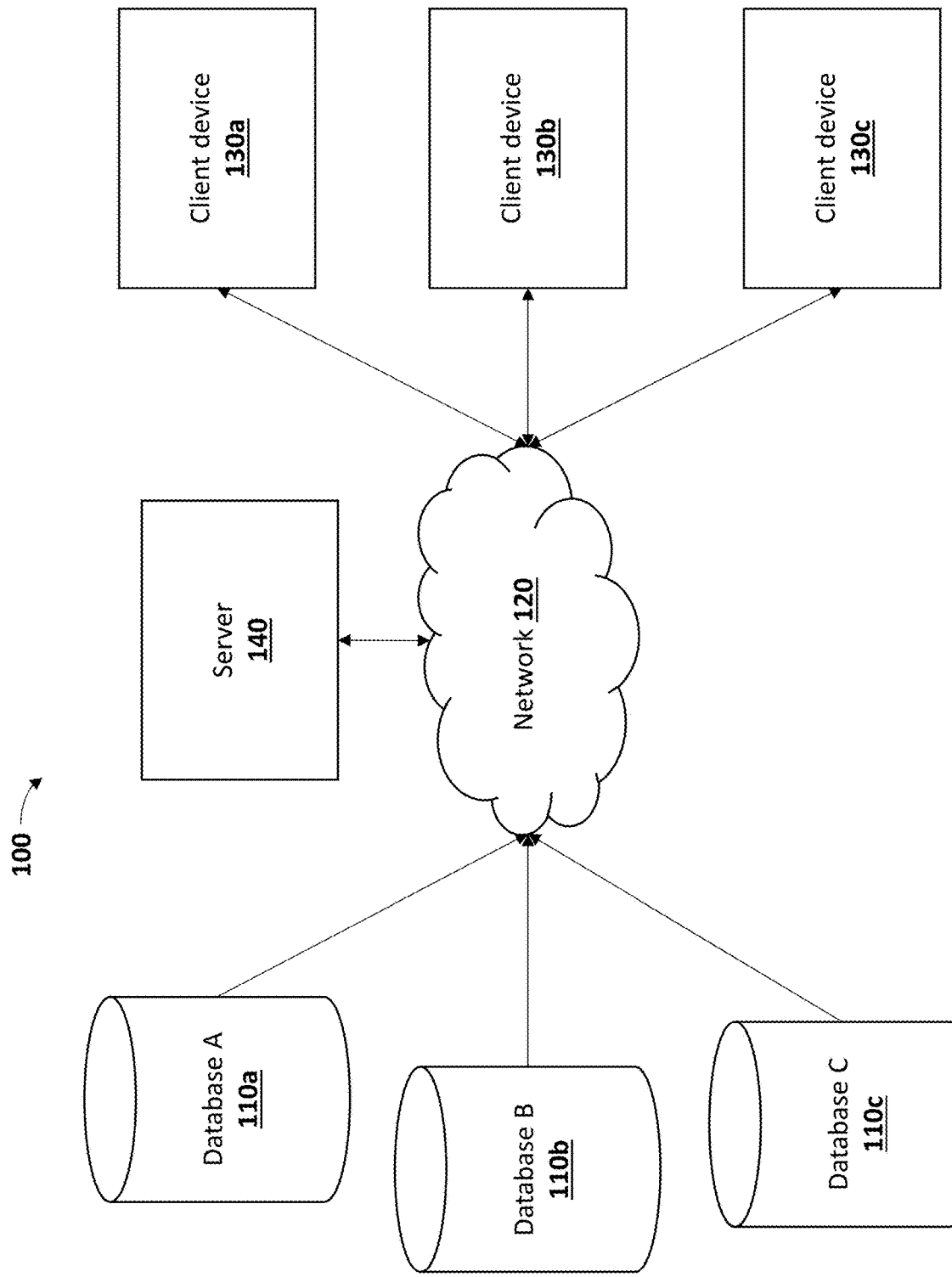
FIG. 1 is a block diagram of a network environment, in accordance with one or more embodiments.

Reference will now be made to the embodiments illustrated in the drawings, and specific language will be used here to describe the same. It will nevertheless be understood that no limitation of the scope of the disclosure is thereby intended. Alterations and further modifications of the features illustrated here, and additional applications of the principles as illustrated here, which would occur to a person skilled in the relevant art and having possession of this disclosure, are to be considered within the scope of the disclosure.

Current technological solutions do not include systems, tools, or platforms that automate both the data collection and SAR report generation processes. In many circumstances, it requires significant efforts to make changes to workflows, decision tools, or related software engines to incorporate a requirement change for identifying suspicious transactions, traceability, and reporting. To address these needs, techniques described herein involve obtaining event data (e.g., cybersecurity event data, transaction data) associated with an event (e.g., cybersecurity event, transaction) from a client device and from one or more bank databases containing transaction data or other forms data related to transactions, applying a prompt generator on the transaction data to generate a large language model (LLM) prompt, and generating a machine-readable suspicious activity (SAR) report in accordance with an LLM prompt. This can all be done in response to receiving a message from one or more systems that a given event (e.g., cybersecurity event, transaction) is a potentially or candidate suspicious event (e.g., cybersecurity event, transaction) that may trigger a SAR report. More specifically, when the systems and methods described herein are implemented, a computing system may obtain (e.g., collect, receive, retrieve, query, generate) various types of data across multiple data sources that may be needed to appropriately generate SAR reports, and preprocess the data to generate the SAR reports.

By implementing the techniques described herein, the systems described enable more timely, accurate, and consistent generation of SAR reports. For example, the systems may, as an initial matter, determine whether a given transaction satisfies the criteria for generating a SAR report. In examples, systems may determine whether the criteria are satisfied by first extracting a feature vector for the transaction, whereby relevant information is aggregated and not relevant information is not aggregated, conserving communications between devices and corresponding memory consumption.

The systems may then apply a fraud prediction engine on the feature vector to generate a fraud risk score. In implementations, the system may proceed where the criteria are satisfied (e.g., where the fraud risk score satisfies a reporting threshold score); but in others the system may forgo proceeding (e.g., where the fraud risk score does not satisfy the reporting threshold score). In this way, implementations described herein provide for selective generation of SAR reports based on corresponding fraud risk scores, thereby reducing the waste of computational resources that would otherwise be used to generate SAR reports that do not need to be submitted. The techniques described herein further eliminate the unnecessary communication of information (and corresponding data transfer) between systems managing various data sources or databases as compared to systems that may generate SAR reports regardless of whether or not a fraud risk score satisfies a reporting threshold.

The systems described herein also enable the more accurate and consistent generation of SAR reports. Unlike systems based on human judgement (which tend to be overly inclusive when discerning between suspicious and not suspicious transactions), systems that implement the presently-disclosed techniques can be trained to determine when a transaction rises to the level of a suspicious transaction based on thousands, millions, or even billions of earlier-processed suspicious and/or not suspicious transactions. Even if tuned to be more inclusive than is otherwise necessary, in implementation, the systems described herein are more accurate than those relying on human intuition. As a result, fewer (if any) unnecessary SAR reports are generated, thereby saving computing resources that would otherwise be dedicated to monitoring transactions and generating SAR reports as necessary.

In some embodiments, the system implements Retrieval-Augmented Generation (RAG) to improve or augment functionality of a prompt generator and/or an LLM. The software programming of the system may invoke or otherwise implement software programming for the RAG model. The RAG programming performs information retrieval or queries in conjunction with the LLM text generation to improve the quality and relevance of the generated outputs. The RAG integrates retrieved information from various internal or external data sources into the text generation process of the LLM, leading to more detailed and/or contextually relevant responses.

When the RAG programming performs retrieval operations, the RAG queries and retrieves various types of relevant documents, passages, or knowledge from a predefined corpus or external sources based on the input query or prompt. In some implementations, the RAG machine-learning model or other executable programming performs various types of data retrieval functions, such as dense or sparse vector similarity searches that locate relevant information based on comparing vectors of the stored data against the vector query to identify which vectors o the stored data satisfy a query match threshold. When the RAG programming performs augmentation operations, the RAG uses the retrieved information to augment the LLM's understanding of the input prompt and enrich the context for subsequent text generation. By incorporating the retrieved information or "knowledge," the LLM's generated outputs become more informed, coherent, and contextually relevant. When the RAG programming performs generation operations, the retrieved information serves as additional context, the machine-learning model of the LLM and/or the machine-learning model of the RAG generates or updates the response outputs generated by the LLM, such that the outputs are more informed and aligned with the retrieved knowledge. The generated text reflects a deeper understanding of the input prompt due to the integration of the retrieved knowledge. In this way, the RAG model or similar machine-learning models for prompt engineering and augmentation may be paired with the LLM such that the combination of these programs and machine-learning architectures may produce outputs that utilize a broader or more-relevant corpus of information, without having to retrain or tune the LLM on the broader or more-relevant corpus.

In some embodiments, an LLM and/or prompt engineering program (e.g., RAG program) that implement personas. In the context of LLMs and RAGs for LLMs, a "persona" generally refers to a set of predefined functions, attributes, characteristics, or preferences that are used to personalize the machine-learning model(s) or the functions of the LLM and/or RAG. By incorporating a persona, the machine-learning model(s) can tailor outputs to align with specific traits or styles, leading to more personalized and contextually relevant responses.

When the LLM or RAG programming performs retrieval operations from internal or external data sources, the retrieval functions may include software configurations to behave as a specified persona, including persona attributes to filter and/or prioritize information that aligns with the specified persona. For instance, if the persona is defined as an expert in a particular knowledge domain, the retrieval process may prioritize retrieving documents authored by or relevant to experts in that particular knowledge domain. When the LLM or RAG programming performs augmentation operations, the software programming uses the retrieved information to augment the LLM's understanding of a prompt input based on a persona's attributes, such as expertise in a knowledge domain. This ensures that the retrieved knowledge aligns with the persona's attributes, such as the expertise, preferences, or characteristics, thereby enriching the context for the LLM's subsequent text generation. When the LLM or RAG programming performs generation operations, the software programming may incorporate a specified persona into the generation process to instruct the LLM and/or RAG model to tailor or customize the outputs based on the specified persona's attributes. The LLM or RAG generates or updates the outputs according to the persona's attributes, resulting in outputs personalized to the persona's attributes or preferences, such as language style, expertise level, or content preferences, among others. In this way, persona-aware capabilities into the LLM and/or the RAG programming enables the LLM to produce more personalized, contextually relevant, and tailored responses that align with the specified persona attributes.

FIG. 1 is a block diagram of an environment 100, in accordance with one or more embodiments. The environment 100 may include database A 110a, database B 110b, and database C 110c, referred to collectively as databases 110. The databases 110 may be in communication with a server 140 via a network 120. The network 120 may be a WAN, such as the internet, or any kind of network. The server 140 may be in communication with client device 130a, client device 130b, and client device 130c, referred to collectively as client devices 130. The server 140 may receive data from the databases 110 and/or the client devices 130.

The databases 110 include any computing device comprising hardware and software components capable of performing the various processes described herein. For example, the databases 110 may be any device including a memory and processor capable of communicating, via the network 120 with one or more other devices of FIG. 1. Non-limiting examples of the databases 110 include data centers, server computers, workstation computers and/or the like. The databases 110 are configured to be in communication with client devices 130 and server 140 via network 120. The databases 110 receive data from the client devices 130 and provide the data to the server 140 based on requests from the server 140 for the data. In some embodiments, the databases 110 are individually or collectively associated with one or more financial institutions, described herein.

The client devices 130 include any computing device comprising hardware and software components capable of performing the various processes described herein. For example, the client devices 130 may be any device including a memory and a processor capable of communicating, via the network 120 with one or more other devices of FIG. 1. Non-limiting examples of the client devices 130 include desktop computers, mobile devices (e.g., cellular phones and tablets), and/or the like. The client devices 130 are configured to be in communication with databases 110 and server 140 via network 120. The client devices 130 provide (e.g., transmit) data to the databases 110 and provide the data to the server 140 based on requests from the server 140 for the data. In some embodiments, the client devices 130 are associated with one or more financial institutions and/or one or more users, described herein. And in embodiments, the client devices 130 work in coordination with, or otherwise control, corresponding databases 110 to perform one or more of the operations described herein.

The server 140 includes any computing device comprising hardware and software components capable of performing the various processes described herein. For example, the server 140 may be any device including a memory and processor capable of communicating, via the network 120 with one or more other devices of FIG. 1 Non-limiting examples of the server 140 includes data centers, server computers, workstation computers and/or the like. The server 140 is configured to be in communication with the databases 110 and the client devices 130 via network 120. The server 140 obtains (e.g., receives) data from the databases 110 and the client devices 130. In some embodiments, the server 140 is associated with one or more financial institutions described herein.

The data described herein may include transaction data associated with a transaction (e.g., a transaction involving one or more individuals such as customers), messages (e.g., messages sent by a client device 130 to server 140), user data associated with a user (e.g., a customer, an individual associated with a financial institution such as an employee, and/or the like), customer data associated with one or more prior transactions (e.g., transactions involving users), account data associated with one or more accounts (e.g., accounts associated with users, accounts associated with prior transactions, and/or the like), prior transaction data associated with one or more prior transactions, payment device details associated with one or more payment devices (e.g., one or more payment cards such as credit cards and debit cards, online credit cards, cards associated with virtual wallets, and/or the like), email data associated with one or more email addresses, document data associated with one or more documents, recording data associated with one or more telephone calls, external data associated with one or more reporting organizations (e.g., credit monitoring services and/or the like), and public data associated with one or more publicly available data sources (e.g., news sources, agencies, and/or the like).

The databases 110 may be associated with various entities. For example, database 110a may be associated with a first financial institution (e.g., a bank such as an issuer bank or an acquirer bank and/or a service provider involved in processing payment transactions, depository institutions (sometimes referred to broadly as banks), depository institution holding companies, non-depository subsidiaries of depository institutions, casinos, card clubs, money services businesses, securities and futures organizations, brokers or dealers in securities, futures commission merchants, mortgage lenders (e.g., residential mortgage lenders), and/or the like), database 110*b* may be associated with the first financial institution and a second financial institution, and database 110*c* may be associated with a third financial institution. The databases 110 may include transaction data for the various entities. The databases 110 may be located in various different jurisdictions and/or contain types of data relevant to particular jurisdictions. For example, database A 110*b* may be located in a first jurisdiction, database B 110*b* may be located in a second jurisdiction, and database C 110*c* may be located in a third jurisdiction. The data stored in the databases 110 may be tagged with or include a parameter indicating from which jurisdiction and/or from which database the server 140 receives the data records. In some implementations, the data and or the data entries of the data may differ in format based on from which database and/or jurisdiction the server 140 receives the data records. The data records may include any of the data described herein. In some implementations, the database A 110*a* may include data associated with demographic information of a customer, including place of residence, citizenship, and other demographic information.

The databases 110 may include data records from multiple jurisdictions and multiple financial institutions. Data records from different jurisdictions and/or financial institutions may have a variety of formats. The data records from the multiple jurisdictions and/or multiple banks may be stored in a single database of the databases 110 or in separate databases of the databases 110. User input may be used to configure the storage of the data records in the databases 110. In an example, user input may be used to store data records from different banks in different databases of the databases 110. In an example, user input may be used to store data records from different jurisdictions in different databases of the databases 110. Storage of the data records may be configurable, with data records stored in different databases based on bank, business area, user type, access level, geography, jurisdiction and/or tax report type. In an example, the server 140 may instruct the databases 110 to store data records from a specific bank in separate databases based on jurisdiction. User access rules may be applied to the databases 110. In this way, the server 140 can be used to obtain data associated with one or more potentially suspicious activities described herein that would otherwise be unobtainable due to access restrictions imposed by each individual financial institution associated with databases 110.

Figure 2:
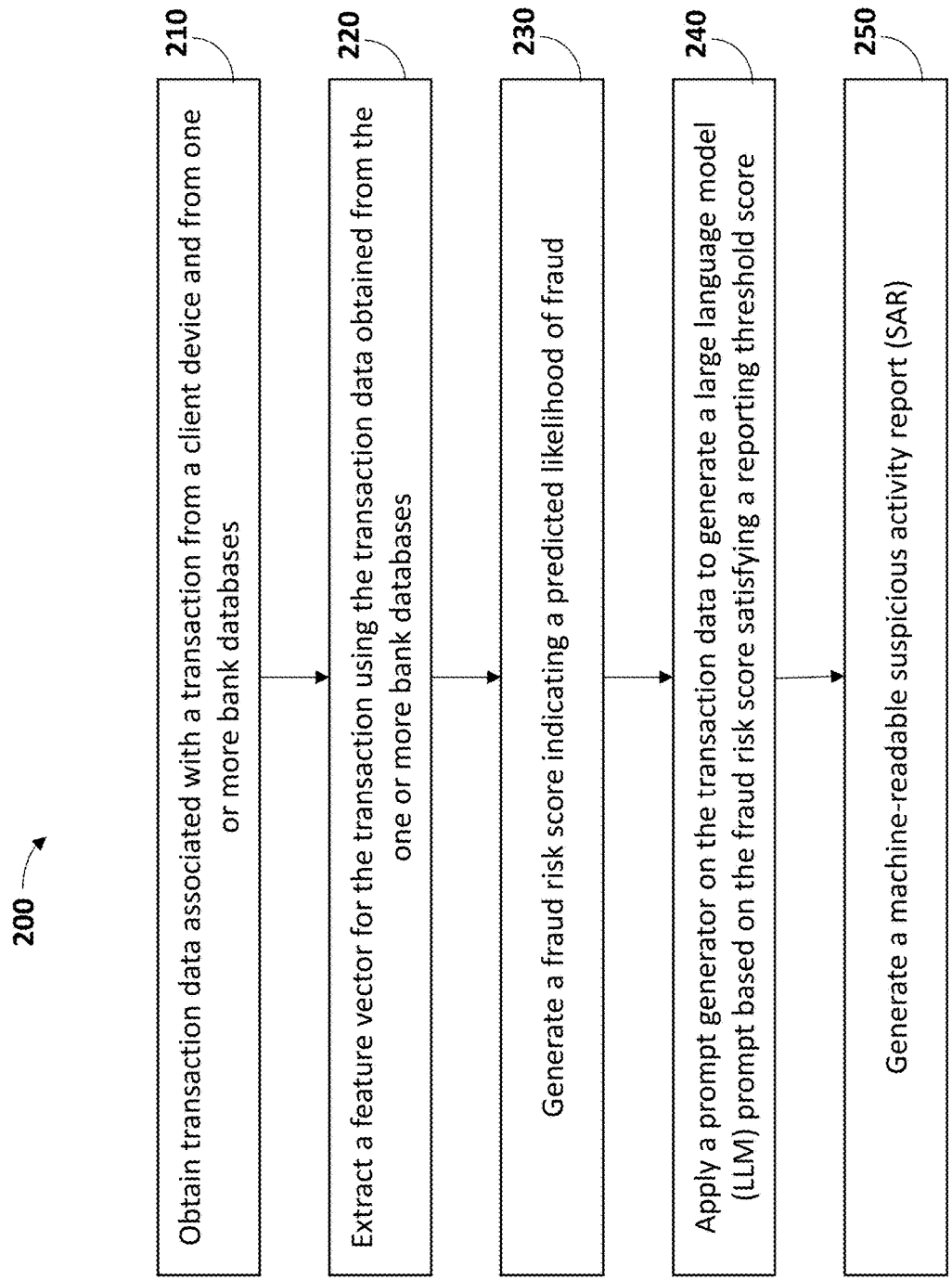
FIG. 2 is a flow chart illustrating operations of a method for generating suspicious activity reports using large language models, in accordance with one or more embodiments.

FIG. 2 is a flow chart illustrating operations in a method 200 for generating suspicious activity reports using large language models. The method 300 may include more or fewer operations than shown. The operations shown may be performed in the order shown, in a different order, or concurrently. The method 300 may be performed by the server 140 of FIG. 1. Additionally, or alternatively, one or more operations involved in performing the method 300 may be performed by a device different from, or in coordination with, the server 140, including the databases 110 and/or the client devices 130.

At operation 210, transaction data associated with a transaction is obtained. For example, a server (e.g., a server that is the same as, or similar to, server 140 of FIG. 1) may obtain the transaction data associated with the transaction. In some implementations, the transaction data is obtained from a client device (e.g., a client device that is the same as, or similar to, client devices 130 of FIG. 1) and/or from a database (e.g., a database that is the same as, or similar to, databases 110 of FIG. 1). In some implementations, the one or more databases may be associated with (e.g., owned by or correspond to) one or more financial institutions as described herein. The transaction may be referred to herein as a potentially suspicious transaction until confirmed by the server based on the fraud risk score associated with the transaction.

In some implementations, the server obtains the transaction data associated with the transaction based on the server receiving messages containing the transaction data via one or more internal or external networks. For example, the server can receive a message from one or more client devices and/one or more databases, where the client devices and the databases are associated with one or more financial institutions. In some examples, the financial institutions are the same as, or similar to, the financial institutions associated with the server.

In some implementations, the messages containing the transaction data comprises an alert indicating that the transaction is a candidate suspicious transaction (e.g., that the transaction is a candidate for inclusion in a SAR). For example, the one or more client devices and/or one or more databases involved in processing the transaction may analyze the transaction and determine that the transaction satisfies criteria corresponding to suspicious activities. As one example, the one or more client devices may analyze the transaction and determine that the amount involved in the transaction satisfies a suspicious amount threshold (e.g., statutorily specified amounts such as $5,000US, $10,000US, $25,000US, and/or the like). In this example, where the suspicious amount threshold is satisfied the one or more client devices may transmit the message including the alert to the server. Additionally, or alternatively, the one or more client devices may analyze the transaction and determine that the transaction is associated with an account that is unverified (e.g., not associated with a known user or organization). In this example, where the account is determined to be unverified, the one or more client devices may transmit the message including the alert to the server.

In some implementations, the server obtains the transaction data by performing one or more functions for querying or analyzing user data and retrieving, deriving, or generating at least a portion of the transaction data based on the user data, where the transaction data and the user data includes data associated with (e.g., related to) a user involved in the transaction. For example, the server may obtain the transaction data and the server may determine one or more users (e.g., individuals) based on the transaction. In some implementations, the server determines the one or more users based on the server identifying one or more user identifiers associated with (e.g., corresponding to) the one or more users involved in the transaction. In some implementations, the server obtains user data associated with the user based on the server identifying the one or more user identifiers associated with the user involved in the transaction. For example, the server may transmit requests to one or more databases (e.g., databases that are the same as, or similar to, databases 110 of FIG. 1) and/or one or more client devices (e.g., client devices that are the same as, or similar to, the client devices 130 of FIG. 1). In this example, the server may transmit the requests to cause the one or more databases and/or the one or more client devices to provide (e.g., transmit) the user data to the server. In this way, the server may obtain the relevant data and associated information from multiple disparate sources where the data may be relevant to determining whether or not a SAR report is necessary. In some implementations, the data associated with the user involved in the transaction includes (e.g., represents) one or more of: a name of the user, a date of birth of the user, a nationality of the user, a credit score of the user, an occupation of the user, employer details of the user, criminal records of the user, previous SARs associated with the user, and/or the like.

In some implementations, the server obtains the transaction data by performing one or more functions for querying or analyzing customer data and retrieving, deriving, or generating at least a portion of the transaction data based on the customer data, where the transaction data and the customer data includes customer data associated with one or more prior transactions involving the user involved in the transaction and/or in the one or more prior transactions. For example, the server may obtain the customer data associated with one or more prior transactions involving the user based on the server identifying the user. In this example, the server may transmit requests to the one or more databases and/or the one or more client devices to cause the one or more databases and/or one or more client devices to provide the customer data to the server. In some implementations, the customer data associated with one or more prior transactions involving the user is further associated with (e.g., represents) one or more transaction values (e.g., a customer type, an amount exchanged during the transaction, a date of the transaction, a time of the transaction, a reason associated with the transaction (e.g., a purchase from a merchant, a transfer for a downpayment on a real estate purchase, and/or the like), and/or the like).

In some implementations, the server obtains the transaction data by performing one or more functions for querying or analyzing account data and retrieving, deriving, or generating at least a portion of the transaction data based on the account data, where the transaction data and the account data include data associated with one or more accounts involving the user involved in the transaction and/or in the one or more prior transactions. For example, the server may obtain the account data associated with one or more accounts involving the user involved based on the server identifying the user. In this example, the server may transmit requests to the one or more databases and/or the one or more client devices to cause the one or more databases and/or one or more client devices to provide the account data to the server. In some implementations, the account data associated with one or more accounts involving the user is further associated with (e.g., represents) one or more account values (e.g., an account identifier, an account opening date, an account activity history, an average transaction value for transactions involving the account, and/or the like).

In some implementations, the server obtains the transaction data by performing one or more functions for querying or analyzing device data and retrieving, deriving, or generating at least a portion of the transaction data based on the device data, where the transaction data includes payment device details associated with one or more payment devices, the payment devices involving (e.g., owned by or assigned to) the user involved in the transaction and/or in the one or more prior transactions. For example, the server may obtain the payment device details associated with one or more payment devices based on the server identifying the user. In this example, the server may transmit requests to the one or more databases and/or the one or more client devices to cause the one or more databases and/or one or more client devices to provide the payment device details to the server.

In some implementations, the payment device details associated with one or more payment devices is further associated with (e.g., represents) one or more values (e.g., a bank identifier, an account identifier, an address, a customer verification code (CVC), and/or the like).

In some implementations, the server obtains the transaction data by performing one or more functions for querying or analyzing email data and retrieving, deriving, or generating at least a portion of the transaction data based on the email data, where the transaction data includes email data associated with one or more emails (e.g., email addresses) involving (e.g., owned by or assigned to) the user involved in the transaction and/or in the one or more prior transactions. For example, the server may obtain the email data associated with the one or more emails based on the server identifying the user. In this example, the server may transmit requests to the one or more databases and/or the one or more client devices to cause the one or more databases and/or one or more client devices to provide the email data to the server. In some implementations, the email data associated with one or more payment devices is further associated with one or more email messages involving (e.g., sent or received by) the user.

In some implementations, the server obtains the transaction data by performing one or more functions for querying or analyzing document data and retrieving, deriving, or generating at least a portion of the transaction data based on the document data, where the transaction data includes document data associated with one or more documents involving the user involved in the transaction and/or in the one or more prior transactions. For example, the server may obtain the document data associated with the one or more documents based on the server identifying the user. In this example, the server may transmit requests to the one or more databases and/or the one or more client devices to cause the one or more databases and/or one or more client devices to provide the document data to the server.

In some implementations, the server obtains the transaction data by performing one or more functions for querying or analyzing recording data and retrieving, deriving, or generating at least a portion of the transaction data based on the recording data, where the transaction data includes recording data associated with one or more recordings involving the user involved in the transaction and/or in the one or more prior transactions. For example, the server may obtain the recording data associated with the one or more recordings based on the server identifying the user. In this example, the server may transmit requests to the one or more databases and/or the one or more client devices to cause the one or more databases and/or one or more client devices to provide the recording data to the server. In some implementations, the recordings are captured prior, during, or subsequent to the potentially suspicious transaction. For example, the recordings may be recordings from conversations conducted between the user and one or more representatives of one or more financial institutions.

In some implementations, the server obtains the transaction data by performing one or more functions for querying or analyzing external data and retrieving, deriving, or generating at least a portion of the transaction data based on the external data, where the transaction data includes external data received for one or more news reporting organizations. For example, the server may obtain the external data associated with one or more news reporting organizations based on the server identifying the user. In this example, the server may transmit requests to the one or more databases and/or the one or more client devices associated with the one or more reporting organizations to cause the one or more databases and/or one or more client devices to provide the external data to the server. In some implementations, the server determines which databases and/or which client devices to transmit the requests to based on the user involved in the potentially suspicious transaction. For example, the server may determine that the user involved in the potentially suspicious transaction lives in an area subject to higher theft and, based on where the user lives, the server may request the external data from news reporting organizations associated with (e.g., reporting on) the area subject higher theft. In some implementations, the external data includes public data associated with one or more publicly available data sources. For example, the one or more publicly available data sources may include one or more bulletins provided by one or more agencies.

At operation 220, a feature vector for the transaction is obtained. For example, the server may extract the feature vector for the transaction based on the server obtaining the transaction data associated with the transaction. In some implementations, the feature vector includes transaction data associated with the transaction (e.g., the potentially suspicious transaction) as described above with respect to operation 210. In some implementations, the feature vector includes a subset of the information available (e.g., some or any of the information represented by any of the data discussed above). For example, the feature vector may include data associated with the account number and address corresponding to the user involved in the potentially suspicious transaction. In another example, the feature vector may include data associated with the account number and one or more documents corresponding to the user involved in the potentially suspicious transaction. In another example, the feature vector may include data associated with one or more of a customer type, whether the customer is a corporation or individual, a exchange volume (e.g., associated with the customer), a customer risk rating, a credit score of the customer, a transaction amount, a product type involved in the transaction, a transaction description, one or more identified transaction patterns, and/or the like. Other examples may include any combination of data described with respect to operation 210.

In some implementations, the server pre-processes the transaction data associated with the transaction and extracts the feature vector based on pre-processing the transaction data. For example, the transaction may include information related to one or more of: transaction amounts, merchant information, transaction time and date, payment method, customer location, transaction frequency, IP address, transaction category, transaction status (e.g., approved or not approved), transaction currency, payment device (card) holders' information, billing address, CVV verification result (authorized or not authorized), merchant category code, and/or the like. In some implementations, the server pre-processes the transaction data by identifying missing information or duplicates and updating the transaction data to include the missing information or remove the duplicates. In one example, the server may pre-process user data associated with the user based on (e.g., in response to) receiving the user data. In some examples, the transaction data is stored in a structured format and the server pre-processes the transaction data based on the structured format. In one example, the server may select certain fields to include when pre-processing the transaction data. In another example, the server may select certain fields not to include when pre-processing the transaction data. The fields to be included or not included may be predetermined based on the structured format of the transaction data. In some examples, the transaction data is stored in an unstructured format and the server pre-processes the transaction data based on the unstructured format. In some implementations, the server pre-processes the transaction data and extracts the feature vector based on the server obtaining the transaction data from one or more databases and/or one or more client devices associated with one or more financial institutions (e.g., one or more banks).

In some implementations, the server may implement one or more pre-processing techniques to pre-process transaction data (either structured transaction data or unstructured transaction data) and extract the feature vector based on the pre-processed transaction data. For example, where the transaction data includes text, the server may perform one or more of the following pre-processing techniques: tokenization (breaking down strings (text) represented by the transaction data into discrete tokens); topic modeling (identifying topics represented by (e.g., that are present in) the transaction data); text weighting (assigning weights to words represented by the transaction data based on frequency); pattern matching (identifying one or more patterns based on words represented by the transaction data to extract information associated with the transaction data); recurrent pattern matching (identifying recurring patterns represented by (e.g., within) the transaction data); and data extraction (extracting structured data from the transaction data and processing the structured data that was extracted similar to how other transaction data is processed as described herein). In some implementations, the server may implement combinations of the one or more pre-processing techniques described above when pre-processing transaction data. For example, the server may perform the following: text pre-processing (processing transaction data by cleaning text represented by the transaction data); tokenize the pre-processed text by breaking down the pre-processed text into individual words or tokens; cleaning noise associated with the pre-processed text by removing or transforming certain parts of the text; assigning weights to words represented by the pre-processed text based on their frequency of occurrence, and pattern matching to extract specific information from the weighted pre-processed text. In some implementations, the server may then extract the feature vector based on the pre-processed transaction data.

At operation 230, the sever generates a fraud risk score. In some implementations, the server generates the fraud risk score, where the fraud risk score indicates a predicted likelihood of fraud associated with the transaction. In some implementations, the server generates the fraud risk score based on a fraud prediction engine. For example, the server may generate the fraud risk score using the fraud prediction engine. In some implementations, the server may apply a fraud prediction engine to the feature vector to generate the fraud risk score. For example, the server may provide the feature vector to the fraud prediction engine to cause the fraud prediction engine to generate an output, the output representing the fraud risk score.

In some implementations, the server may determine whether the fraud risk score satisfies a reporting threshold score. For example, the server may compare the fraud risk score to a reporting threshold score to determine whether the fraud risk score satisfies the reporting threshold score. In some implementations, the server may perform one or more of the operations described herein based on determining that the fraud risk score satisfies the reporting threshold score.

In other implementations, the server may forgo one or more of the operations described herein based on determining that the fraud risk score satisfies the reporting threshold score. For example, the server may determine that the fraud risk score satisfies the reporting threshold score and perform additional analysis to determine that an exception applies to the potentially suspicious transaction.

In some implementations, the server may cluster one or more transactions not associated with the user (referred to as non-affiliated transactions). In this example, the server may cluster the one or more non-affiliated transactions using nearest neighbor clustering techniques, K-means clustering techniques, and/or the like. The server may then associate each cluster with a tag corresponding to the non-affiliated transactions in the cluster. For example, the server may associate each cluster with a suspicious transaction tag or a not suspicious transaction tag. In this way, the server may then compare the potentially suspicious transaction to the clustered non-affiliated transactions. The server may then determine whether to proceed with one or more operations described herein based on the server determining that the potentially suspicious transaction is associated with a cluster of non-affiliated transactions having a suspicious or not suspicious transaction tag. In this way, the server can choose to forgo continued processing and generation of a SAR report if the potentially suspicious transaction would unnecessarily cause the generation of the SAR report (e.g., where the potentially suspicious transaction is a false-positive).

In some implementations, the server may generate and train a random forest model to determine whether a transaction is a suspicious transaction or a not suspicious transaction. For example, the server may train a random forest model based on one or more non-affiliated transactions having the suspicious or not suspicious transaction tags. Once trained, the server may provide the transaction data associated with the transaction (the potentially suspicious transaction) to the random forest model to cause the random forest model to generate an output. The output can be an indication of whether the transaction is a suspicious transaction or not a suspicious transaction. The server may then determine whether to proceed with one or more operations described herein based on the server using the random forest model to determine whether the potentially suspicious transaction is a suspicious transaction or a not suspicious transaction. Similar to the use of clustering, in this way, the server can choose to forgo continued processing and generation of a SAR report if the potentially suspicious transaction would unnecessarily cause the generation of the SAR report (e.g., where the potentially suspicious transaction is a false-positive).

In some implementations, the server may generate and train a logistic regression (LoR) machine (or model) to determine whether a transaction is a suspicious transaction or a not suspicious transaction. For example, the server may train a LoR model based on one or more non-affiliated transactions having the suspicious or not suspicious transaction tags. Once trained, the server may provide the transaction data associated with the transaction (the potentially suspicious transaction) to the LoR model to cause the LoR model to generate an output. The output can be an indication of whether the transaction is a suspicious transaction or not a suspicious transaction. The server may then determine whether to proceed with one or more operations described herein based on the server using the LoR model to determine whether the potentially suspicious transaction is a suspicious transaction or a not suspicious transaction. Similar to the use of clustering and random forest model implementations, in this way, the server can choose to forgo continued processing and generation of a SAR report if the potentially suspicious transaction would unnecessarily cause the generation of the SAR report (e.g., where the potentially suspicious transaction is a false-positive).

In some implementations, the additional analysis may include comparing the transaction (e.g., one or more aspects of the transaction such as the purpose for the transaction) to one or more exempt purposes and forgoing application of a prompt generator (described herein) based on comparing the transaction to the one or more exempt purposes. In an example, the server may compare a purpose (e.g., that a transaction was initiated to provide a down payment on real estate as a precondition to receiving a mortgage) with one or more exempt purposes (e.g., one or more acceptable transactions involving the purchase of property) and determine that the purpose matches the exempt purpose. In another example, the server may compare a purposes (e.g., that a transaction was to transfer funds between accounts of the user held at the same financial institution) with an exempt purpose (e.g., reallocating funds across accounts involving a user) and determine that the purpose matches the exempt purpose.

At operation 240, the server applies a prompt generator on the transaction data. In some implementations, the server applies the prompt generator on the transaction data based on (e.g., in response to) the server determining that the fraud risk score satisfies the reporting score threshold. In some implementations, the server applies the prompt generator by providing the data associated with the transaction to the prompt generator to cause the prompt generator to provide an output. In this example, the output of the prompt generator can include one or more strings of text. In some implementations, the output of the prompt generator includes a large language model (LLM) prompt. For example, the output of the prompt generator can include an LLM prompt, the LLM prompt including a string of text that can be provided to an LLM and cause the LLM to provide as output one or more report strings.

At operation 250, the server generates a machine-readable SAR. In some implementations, the server generates the machine-readable SAR based on (e.g., using) the LLM prompt. For example, the server can generate the machine-readable SAR based on the server providing the LLM prompt to a model. In some examples, the model can include a large language model (LLM). In this example, the server may provide one or more strings associated with the LLM prompt serially to the LLM to cause the LLM to provide corresponding outputs. In some implementations, the server may provide all of the strings associated with the LLM prompt to the model to cause the model to provide an output. For example, the server may provide all of the strings associated with the LLM prompt to the model to cause the model to provide an output, where the output represents a machine-readable SAR report. In examples, the server provides the LLM prompt to the model to cause the model to provide one or more strings as output (e.g., as a set of strings). In some implementations, the SAR report includes information such as; identifiers associated with individuals involved in the transaction, payment devices (e.g., instruments or mechanisms) used to perform at least part of the transaction, a point in time during which the potentially suspicious transaction occurred, a location at which the potentially suspicious transaction occurred (e.g., a physical location, an IP address, and/or the like), and/or an indication as to why one or more individuals associated with a financial institution believes the activity may be suspicious (e.g., the transaction was one of many performed in a short period of time, the transaction involved a user or account known to be involved in previously-performed suspicious transactions, and/or the like), and/or like information.

In some implementations, the server generates the machine-readable SAR based on the output of the model. For example, the server can generate the machine-readable SAR based on the server including the one or more strings (either generated serially or as a set of strings) provided as the output of the model in one or more fields of a predefined SAR.

In some implementations, the server generates the model based on the transaction data. For example, the server may include information represented when obtaining the transaction data in the SAR. In doing so, the server may forgo using one or more models to complete at least a portion of the SAR. For example, the server may analyze the transaction data, messages, user data, customer data, account data, prior transaction data, payment device details, email data, document data, recording data, external data, and public data. Based on analyzing this data, the server can copy some or all of the information stored therein into the SAR. As an example, the server can copy the full name, address, date of birth, occupation, etc. of the user involved in the transaction into one or more relevant fields of the SAR. A non-exhaustive list of information that can be included in the SAR in this manner includes: information from the reporting financial institution (e.g., the institution's name, address, primary federal regulator, address of a branch office involved, a close date, and account numbers), information from the user (e.g., full name, address, date of birth, occupation, admission(s)/confession(s), type of identification presented (e.g., drivers license, passport, and/or the like), relationship to the financial institution involved (e.g., customer, employee, etc.), insider relationship status, and date of suspension/resignation/termination), information associated with the suspicious activity involved (e.g., a date range of suspicious activity, an amount involved, characteristics of the activity, an amount lost, an amount recovered, whether financial soundness is affected, identifiers of law enforcement agencies involved, a name or phone number of a law enforcement agency involved, and/or the like), information associated with a contact of assistance (e.g., a name, title, occupation, phone number, date prepared, and agency), and information about the suspicious activity involved (e.g., a description of the activity, a chronological account of events, a complete law violation account, unusual activities involved, and/or the like).

In some implementations, the server generates dashboard data associated with one or more dashboards. For example, the server may generate the dashboard data based on the SAR. And in other examples, the server may aggregate multiple SARs that are related to different suspicious transactions and determine one or more metrics based on the multiple SAR reports. In some implementations, the one or more metrics include a number of SAR reports generated in a period of time, a number of SARs associated with one or more IP addresses, and/or the like. In some implementations, the one or more dashboards may provide one or more fields for a user (e.g., a user operating a client device) to provide feedback as they review the one or more SARs. This feedback can then be used to edit and finalize the SARs and/or to fine tune the model used to generate the SAR. In some implementations, the data associated with the one or more dashboards is configured to cause a display of the server or a client device to display the one or more dashboards.

In some implementations, the server transmits data associated with one or more SARs to a client device, where the client device is associated with a regulatory agency. For example, the server may generate data associated with one or more SARs as they are generated and/or updated and the server may then transmit the data associated with the one or more SARs to a client device. In this example, the client device may be associated with a regulatory agency such as, for example, the U.S. Department of Treasury's Financial Crimes Enforcement Network (FINCEN) or other similar agencies. In some implementations, the client device associated with the regulatory agency receives feedback as input that can be used to update the model and provides data associated with the feedback to the server to cause the server to update the model used to generate the SAR.

In some implementations, the server updates the model. For example, the server may update the model based on feedback data associated with feedback corresponding to the machine-readable SAR reports. In some implementations, the server obtains the feedback data based on the server receiving input at one or more client devices (e.g., one or more client devices that may be the same as, or similar to, client devices 130 of FIG. 1). For example, a client device may display the machine-readable SAR report and, based on displaying the machine-readable SAR report, receive input from a user. The input may represent one or more updates to be made to one or more fields associated with the SAR report. The client device may then generate the feedback data based on the input and provide the feedback data to the server.

In some implementations, the server updates the model based on receiving the feedback data. For example, the server may update the model by providing the transaction data, the LLM prompt, and the feedback data to the model. The combined transaction data, LLM prompt, and feedback data may be configured to cause the model to be updated. For example, the combined transaction data, LLM prompt, and feedback data may be provided to the model to cause the model to update one or more weights. The model may then compare a revised output (e.g., an output based on the LLM prompt) to the feedback (associated with the feedback data) and determine a degree of error. In some implementations, the model may repeat this process until a threshold degree of error (e.g., an acceptable degree of error) is satisfied.

As described herein, a large language models are implemented. LLMs are a type of language model that improve on existing models that take in text (words) sequentially and predict the next token or word based on the previous word or sets of words. LLMs are structured similar to transformer models given their ability for processing sequential inputs (words) and identifying correlations between the sequential inputs using an attention mechanism. In use, LLMs take as input a set of words and generate a corresponding set of words as an output. To train an LLM, the LLM is provided as input multiple datasets of text, including books, articles, and/or the like. Self-supervision is then implemented and the output of the LLM is compared to the expected output (e.g., the next word when trained on a word-by-word basis). LLMs can be further trained (e.g., fine-tuned) using more specific inputs that are domain-specific. For example, as described herein, an LLM can be trained using one or more SAR reports (e.g., one or more fields in one or more SAR reports).

As described herein, clustering techniques may be implemented. In one example embodiment, K-means clustering (KMC) is implemented. KMC assumes data points have implicit shared characteristics and "clusters" data within a centroid or "mean" of the clustered data points. During training, KMC adds a number of k centroids and optimizes its position around clusters. This process is iterative, where each centroid, initially positioned at random, is re-positioned towards the average point of a cluster. This process concludes when the centroids have reached an optimal position within a cluster. Training of a KMC module is typically unsupervised. In example embodiments, user interaction histories are used to train the centroids of a KMC machine learning module, which, after training, is used to estimate whether a user is likely to conduct a fraudulent interaction.

In one example embodiment, K-nearest neighbor clustering (KNN) is implemented. On a general level, KNN shares similar characteristics to KMC. For example, KNN assumes data points near each other share similar characteristics and computes the distance between data points to identify those similar characteristics but instead of k centroids, KNN uses k number of neighbors. The k in KNN represents how many neighbors will assign a data point to a class, for classification, or object property value, for regression. Selection of an appropriate number of k is integral to the accuracy of KNN. For example, a large k may reduce random error associated with variance in the data but increase error by ignoring small but significant differences in the data. Therefore, a careful choice of k is selected to balance overfitting and underfitting. Concluding whether some data point belongs to some class or property value k, the distance between neighbors is computed. Common methods to compute this distance are Euclidean, Manhattan or Hamming to name a few. In some embodiments, neighbors are given weights depending on the neighbor distance to scale the similarity between neighbors to reduce the error of edge neighbors of one class "outvoting" near neighbors of another class. In one example embodiment, k is 1 and a Markov model approach is utilized. In example embodiments, user interaction histories are used to train a KNN machine learning module, which, after training, is used to estimate whether a user is likely to conduct a fraudulent interaction.

In one example embodiment, random forest (RF) is implemented. RF consists of an ensemble of decision trees producing individual class predictions. The prevailing prediction from the ensemble of decision trees becomes the RF prediction. Decision trees are branching flowchart-like graphs comprising of the root, nodes, edges/branches, and leaves. The root is the first decision node from which feature information is assessed and from it extends the first set of edges/branches. The edges/branches contain the information of the outcome of a node and pass the information to the next node. The leaf nodes are the terminal nodes that output the prediction. Decision trees can be used for both classification as well as regression and is typically trained using supervised learning methods. Training of a decision tree is sensitive to the training data set. An individual decision tree may become over or under-fit to the training data and result in a poor predictive model. Random forest compensates by using multiple decision trees trained on different data sets. In example embodiments, user interaction histories are used to train the nodes of the decision trees of a RF machine learning module, which, after training, is used to estimate whether a user is likely to conduct a fraudulent interaction.

In one example embodiment, logistic regression machine learning is implemented. Logistic Regression is typically used in machine learning to classify information, such as user interaction histories into categories such as whether a user is likely to conduct a fraudulent interaction. LoR takes advantage of probability to predict an outcome from input data. However, what makes LoR different from a linear regression (LiR) models is that LoR models use a more complex logistic function, for example a sigmoid function.

In addition, the cost function can be a sigmoid function limited to a result between 0 and 1. For example, the sigmoid function can be of the form $f(x)=1/(1+e^{-x})$, where x represents some linear representation of input features and tuning variables. Similar to LiR models, the tuning variable(s) of the cost function are optimized (typically by taking the log of some variation of the cost function) such that the result of the cost function, given variable representations of the input features, is a number between 0 and 1, preferably falling on either side of 0.5. Gradient descent may also be used in LoR cost function optimization and is an example of the process. In example embodiments, user interaction histories are used as the independent variables to train a LoR model, which, after training, is used to estimate, for example, whether a user is likely to conduct a fraudulent interaction.

Figure 3A:
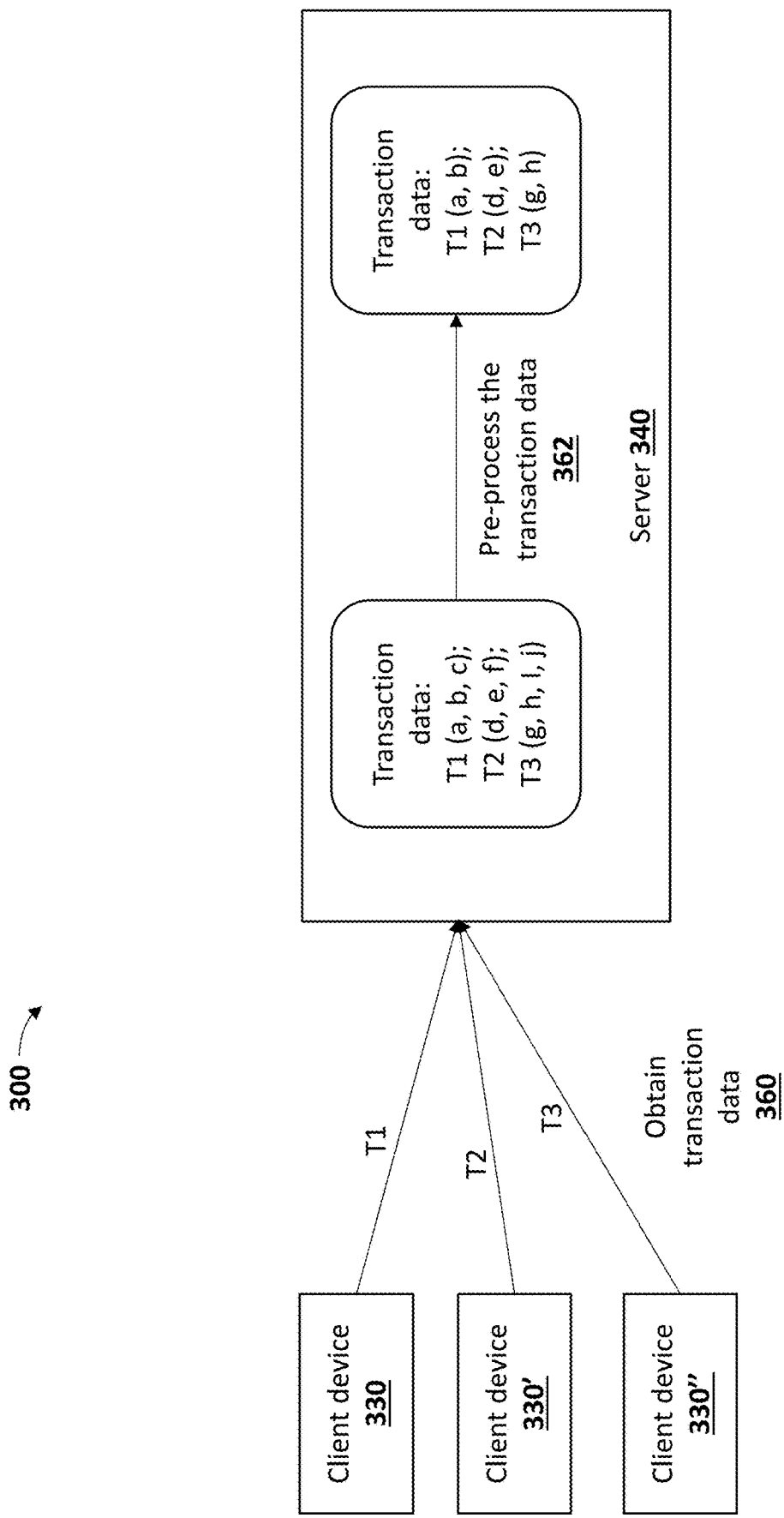
FIGS. 3A-3E illustrate a non-limiting example of an implementation of techniques for generating suspicious activity reports using large language models, in accordance with one or more embodiments.
Figure 3B:
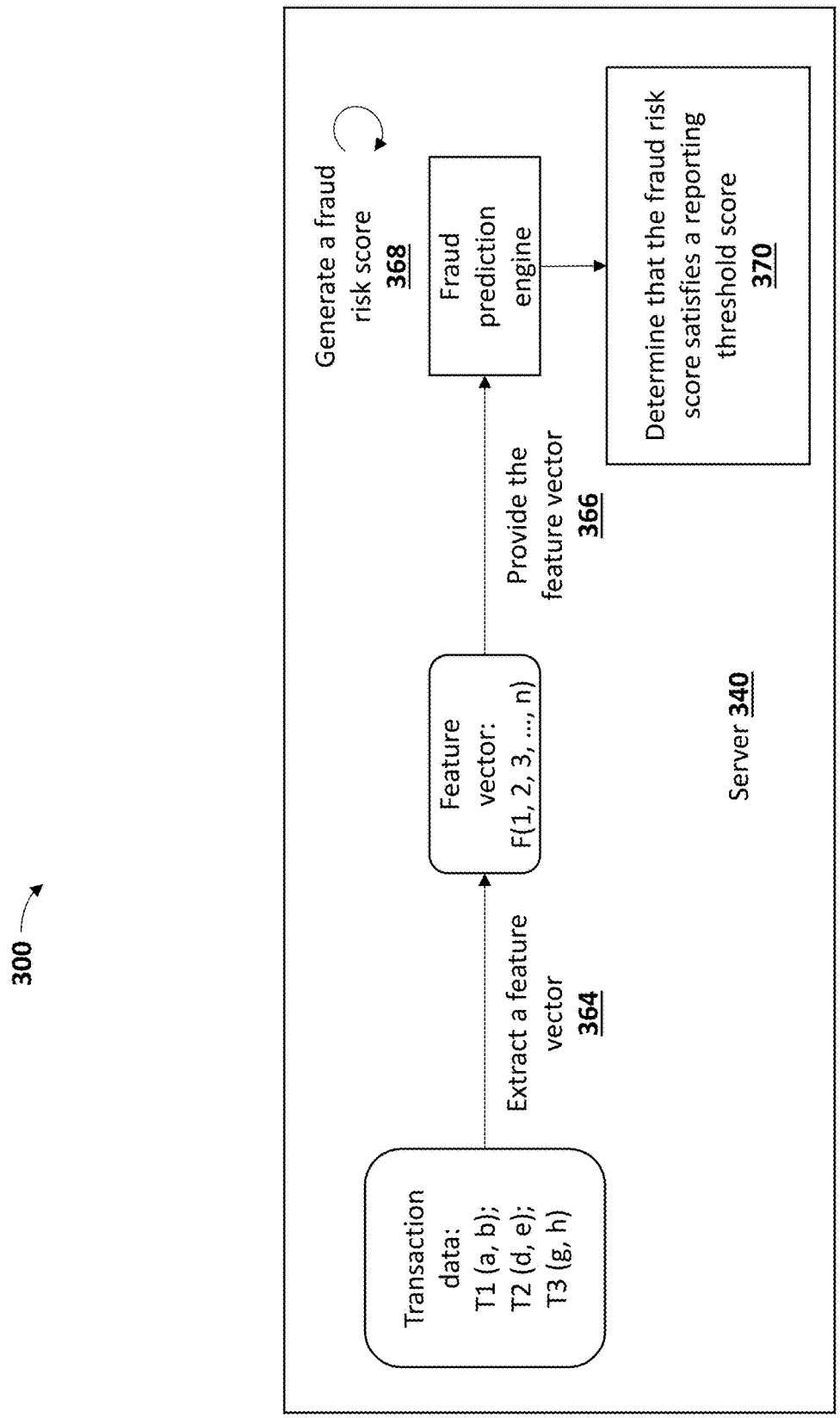
Figure 3C:
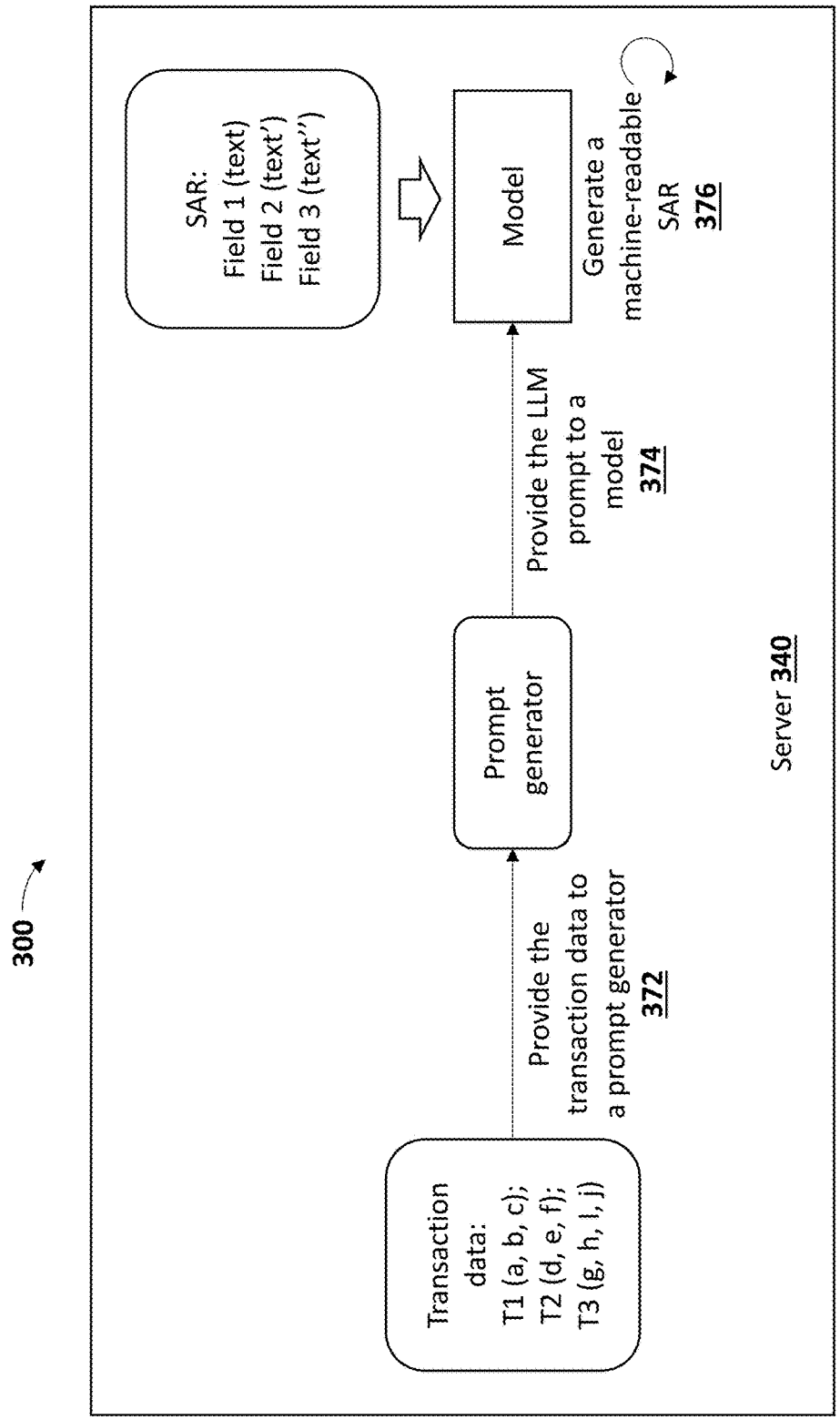
Figure 3D:
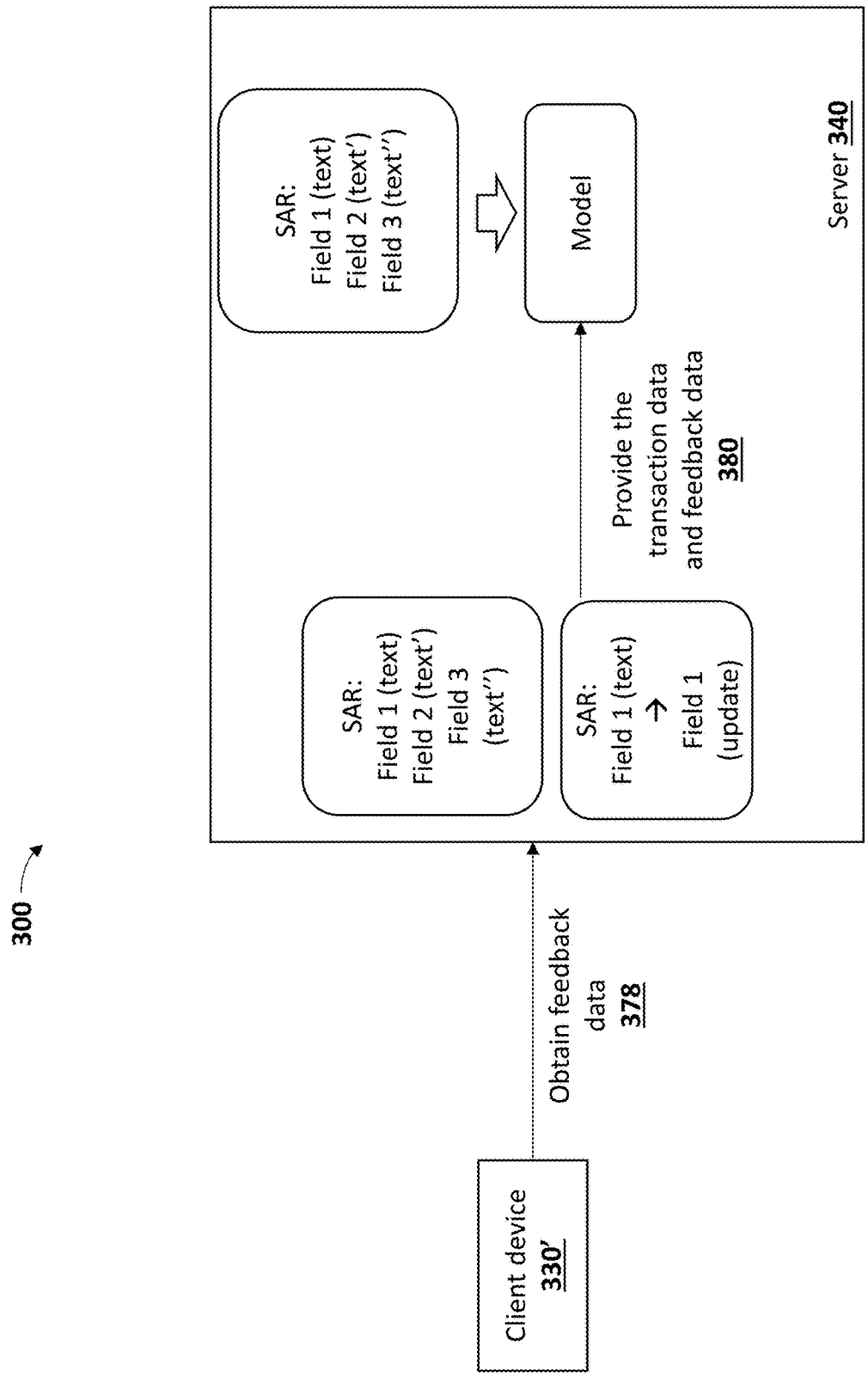
Figure 3E:
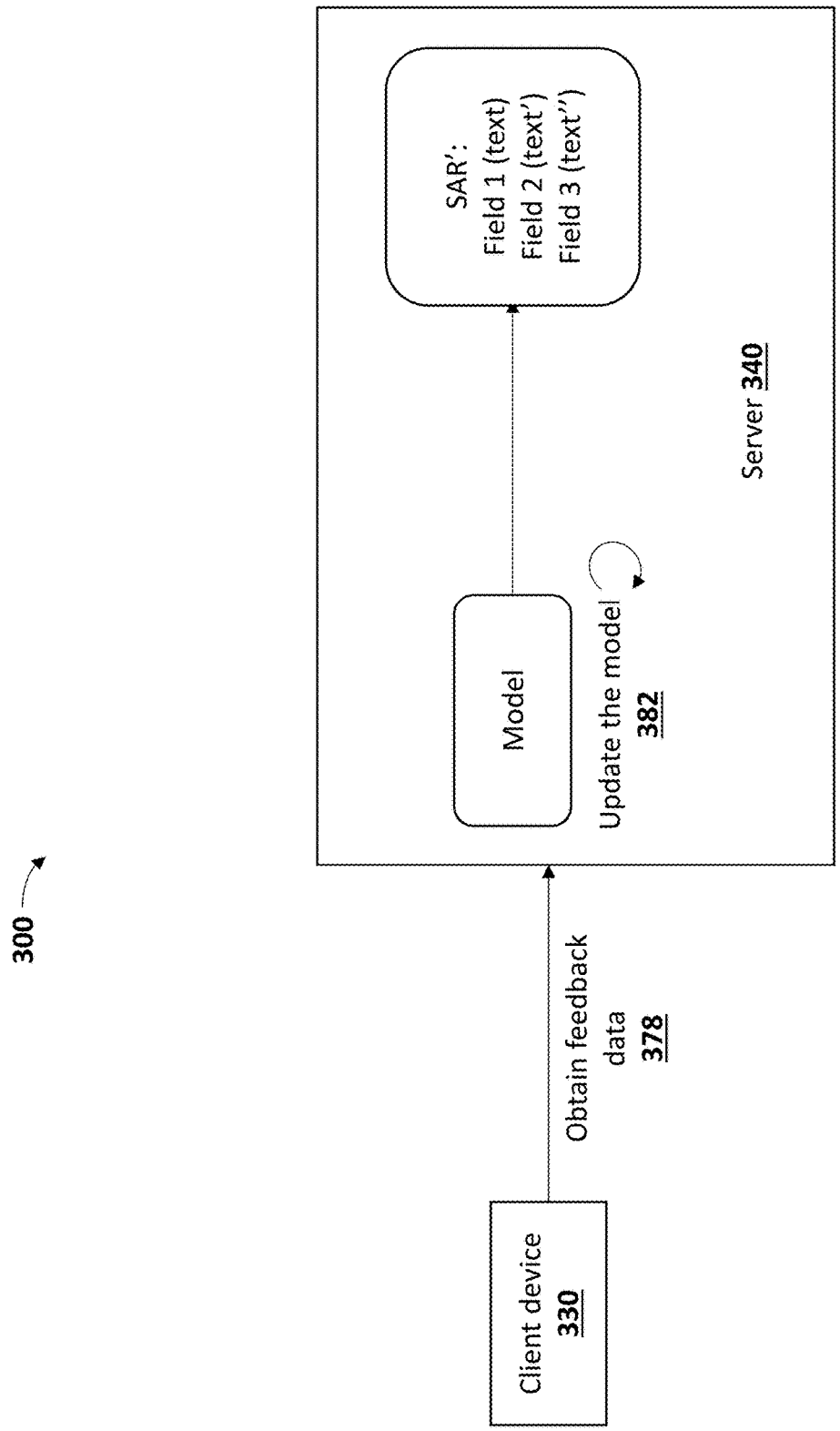

FIGS. 3A-3C illustrate a non-limiting example of an implementation 300 of techniques for generating suspicious activity reports using large language models in accordance with one or more embodiments. In some implementations, one or more of the computing devices described may be the same as, or similar to, one or more of the computing devices of FIG. 1. For example, client devices 330, 330', 330" (collectively referred to as client devices 330) may be the same as, or similar to, client devices 130 of FIG. 1; and server 340 may be the same as, or similar to, server 140 of FIG. 1. In some implementations, client devices may be the same as, similar to, or replaced with, databases 110 of FIG. 1.

As shown by reference number 360, the server 340 obtains transaction data from client devices 330. In some implementations, the server 340 obtains the transaction data based on the client device 330 transmitting the transaction data in response to the client device 330 determining that the transaction is a potentially suspicious transaction. For example, one or more client devices 330 may determine that the transaction satisfies one or more criteria corresponding to suspicious activities (e.g., that the transaction value exceeds $5,000US or that a group of related transactions exceeds $25,000US). In this example, the one or more client devices 330 may then transmit the transaction data to the server 340 for further analysis in accordance with the techniques described by the present disclosure.

As shown by reference number 362 the server 340 pre-processes the transaction data. For example, the server 340 may update (e.g., normalize) one or more fields corresponding to the transaction by adding, removing, or changing the information represented by those one or more fields. In some implementations, the server 340 may pre-process the transaction data based on the server 340 determining that the data received is from a structured or unstructured source.

As shown by reference number 364, the server 340 extracts a feature vector. For example, the server 340 can extract a feature vector based on the transaction data associate with the transaction. In some examples, the server 340 extracts the feature vector based on pre-processing the transaction data. In other examples, the server 340 may extract the feature vector based on the server 340 forgoing the pre-processing of the transaction data.

As shown by reference number 366, the server 340 provides the feature vector to the fraud prediction engine. For example, the server 340 may provide the feature vector to the fraud prediction engine to apply the fraud prediction engine to the feature vector. In this example, the fraud prediction engine may provide as an output a fraud risk score.

As shown by reference number 368, the server 340 generates a fraud risk score. For example, the server 340 may generate the fraud risk score based on the server 340 providing the feature vector to the fraud prediction engine (described above with respect to reference number 366). In this example, the fraud prediction engine may then provide as output the fraud risk score.

As shown by reference number 370, the server 340 determines that the fraud risk score satisfies a reporting threshold score. For example, the server 340 may compare the fraud risk score to a predetermined value corresponding to the reporting threshold score. In this example, the server 340 may then determine that the fraud risk score satisfies the reporting threshold score.

As shown by reference number 372, the server 340 provides the transaction data to a prompt generator. For example, the server 340 may provide the transaction data to the prompt generator based on (e.g., in response to) the server 340 determining that the fraud risk score satisfies the reporting threshold score. In some implementations, the prompt generator is configured to provide as output an LLM prompt.

As shown by reference number 374, the server 340 provides the LLM prompt to a model. For example, the server 340 may provide the LLM prompt as an input to the model. In this example, the model may be an LLM or any other suitable model capable of generating data for a SAR report. For example, the LLM may be a model that is trained on vast amounts of data (e.g., books, articles, etc.) and then fine-tuned on domain-specific data (e.g., other SAR reports that are identified as appropriate SAR reports for submission). In some implementations, the model is configured to provide as output data associated with a SAR report.

As shown by reference number 376, the server 340 generates a machine-readable SAR. For example, the server 340 may generate the machine-readable SAR based on the server providing the LLM prompt as input to the model. In some implementations, the output of the model is a machine-readable SAR. In other implementations, the output of the model includes data associated with one or more strings of text. For example, the output of the model may include data associated with one or more strings of text, where each string of text corresponds to a field of a SAR report. In this example, the server 340 may generate the machine-readable SAR by including the one or more strings of text in corresponding fields of a SAR (e.g., of a blank or unfilled SAR).

As shown by reference number 378, the server 340 obtains feedback data from a client device 330. For example, the server 340 may obtain the feedback data based on one or more users viewing the SAR (generated by the server 340 as represented by reference number 376) via the client device 330. For example, the client device 330 may receive input based on one or more users viewing the SAR, where the input corresponds to one or more updates made to one or more fields in the SAR. In some implementations, the server 340 may obtain the feedback data from multiple client devices 330. The feedback data may be associated with feedback corresponding to the machine-readable SAR, where the feedback is configured to cause a model to be updated.

As shown by reference number 380, the server 340 provides the transaction data and the feedback data to the model (e.g., the model as represented by reference number 374) to cause the model to be updated.

As shown by reference number 382, the server 340 updates the model. For example, the server 340 may update the model by changing one or more weights associated with the model. The sever 340 may then compare the output of the model based on (e.g., by providing) the transaction data (discussed with reference to reference numbers 360 and 362) to the model to cause the model to output a different SAR report and repeat the update process until a satisfactory output is generated. In an example, a satisfactory output is an output where a threshold number of words correspond between the output of the model and the feedback.

Some embodiments implement RAG models and/or personas for improving or augmenting the operations of the LLM when generating SAR files. Generally, RAG refers to certain software functions related to LLMs for information retrieval and text-generation to enhance the quality and relevance of the outputs generated by the LLM.

Figure 4:
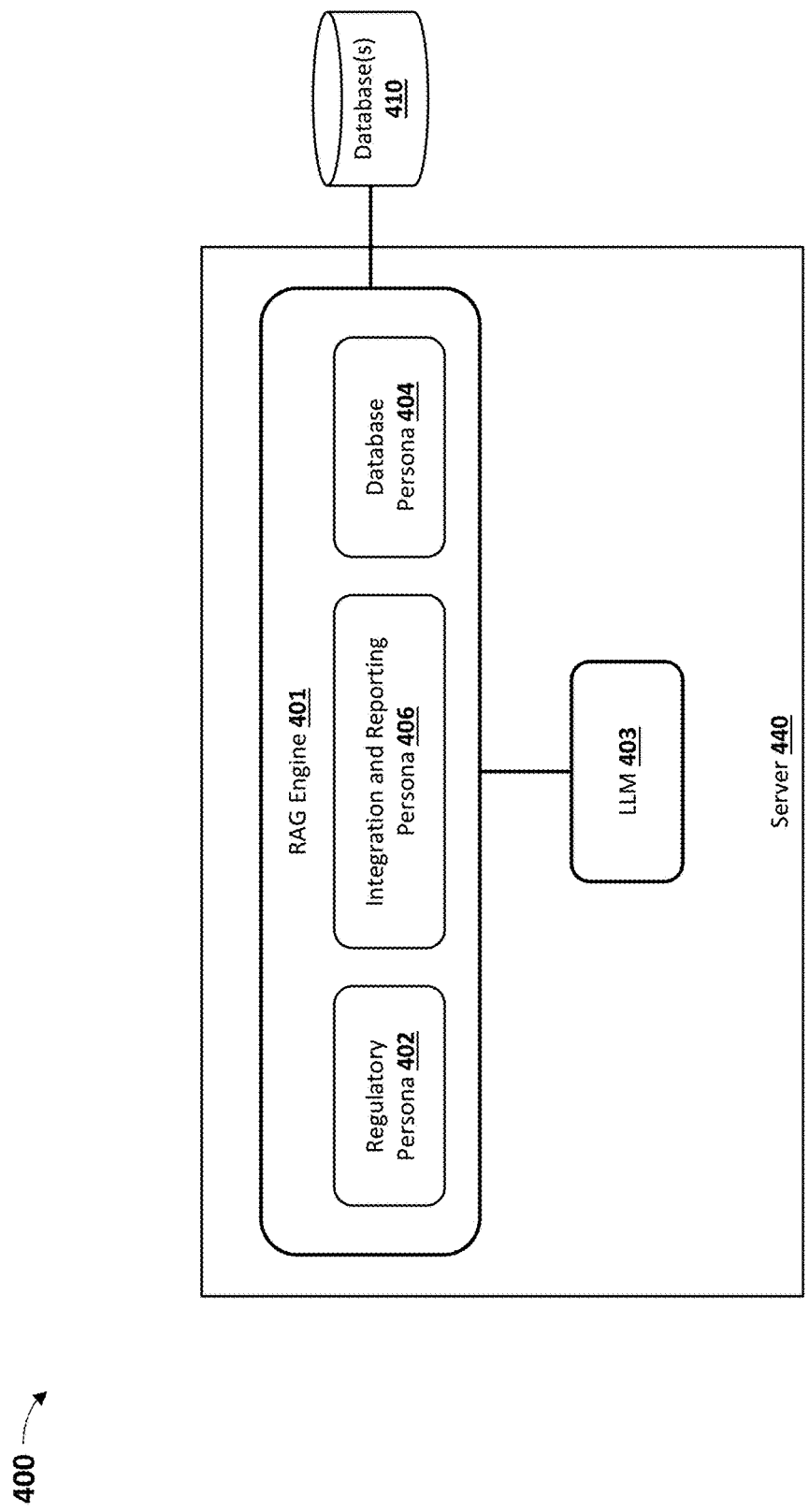
FIG. 4 shows components of a system for generating SARs using an LLM having a RAG engine or similar types of augmentation programming, in accordance with one or more embodiments.

FIG. 4 shows components of a system 400 for generating SARs using an LLM 403 having a RAG engine 401 or similar types of augmentation programming. The system 400 includes one or more servers 440 (e.g., server 140, 340) and one or more databases 410 (e.g., databases 110) of various internal or external data sources. The functions and features of the servers 440 have been previously described. The server 440 of FIG. 4 may execute machine-readable code of software programming and configurations for implementing the RAG engine 401 and the LLM 403 for generating the SAR files. The RAG engine 401 may include programming for retrieval operations, augmentation operations, and generation operations for improving upon the LLM 403 operations for generating the SAR files, among other functions described herein (e.g., fraud detection, prompt generator). In some embodiments, the RAG engine 401 and/or the LLM 403 may implement or invoke various types of personas for tailoring or customizing the various operations of the RAG engine 401 and how the RAG engine 401 affects the LLM 403.

The databases 410 may be hosted in any number of computing devices of various internal or external data sources having non-transitory machine-readable storage for storing various types of data records. As an example, the database(s) 410 of internal data sources may contain data records of previous SAR filings, various preconfigured thresholds or other types of configurations, and SAR templates, among other types of information of prior inputs or outputs and operational configurations of the RAG engine 401 or LLM 403. As another example, the database(s) 410 of external data sources may contain data records of regulatory requirements related to SARs, user reputation information, document reputation or recognition information, and SAR templates, among other types of information from external data sources for training or implementing the RAG engine 401 or LLM 403.

The RAG engine 401 includes software programming for performing various RAG operations for augmenting the functions and outputs of the LLM 403 or other types of functions of the server 440 when generating SARs. The software programming of the RAG engine 401 may be executed by the server 440 or other computing device accessible to the LLM 403. The RAG engine 401 accesses one or more databases 410 of the internal or external data sources and incorporates various types data and information (e.g., recent updates, client specific data) into the machine-learning model(s) of the RAG engine 401 or the LLM 403. The RAG engine 401 may, for example, incorporate the various types of information dynamically during the generation process of the LLM 403, when generating the SAR outputs.

The RAG engine 401 may execute operations for augmenting and improving upon the operations of the LLM 403, including retrieval operations, augmentation operations, and generation operations. The RAG engine 401 may execute and implement a machine-learning model for the retrieval operations. The server 440 may perform training functions and operations that train the machine-learning model of the data retrieval operations. The server 440 may train the machine-learning model for retrieval operations to query the databases 410 using sample data inputs as examples and example vectors that are trained to map questions or prompts to relevant documents or information source records. The RAG engine 401 may execute certain types of retrieval operations, such as Elasticsearch or vector search, to query the one or more databases 410 and retrieve relevant documents from the database(s) 410 at inference time, based on the transaction details or query context. The RAG engine 401 may extract feature vectors as mathematical representations of various features of, for example, the input text of a client device, a prompt generated by a prompt generator or by a user, or other types of data used for performing the data query and retrieval operations of the RAG engine 401. The machine-learning model of the RAG engine 401 may then query the one or more databases 410 for feature vectors of pre-stored data similar to or matching the query feature vector.

In some embodiments, the RAG engine 401 may implement Chain-of-Thought Reasoning (COT) machine-learning models to handle complex multi-step reasoning effectively, which may include performing functions for integrating and reporting information. Generally, when COT operations are implemented in conjunction with the LLM 403, the COT operations may improve the reasoning and decision-making capabilities of the LLM 403 and/or RAG models of the RAG engine 401 by explicitly breaking down complex functions into a sequence of intermediate steps. This approach mimics human problem-solving processes, where a problem is often solved through a series of logical and sequential steps rather than attempting to arrive at a solution in a single leap. When the server 440 receives transaction data or a query or problem statement that requires reasoning or multi-step processing, a COT-enabled machine-learning model of the RAG engine 401 is prompted to generate a series of intermediate steps or outputs that lead to the solution. The RAG engine 401 generates the intermediate outputs sequentially, one-by-one, each depending on the preceding intermediate output. The COT machine-learning model of the RAG engine 401 generates the intermediate outputs and then algorithmically combines the intermediate outputs to generate a final output, where each intermediate output logically follows from and depends on the preceding intermediate output.

For instance, for the integration and reporting persona 406, the server 440 trains the machine-learning model of the RAG engine 401 using the COT approach, where the RAG model explicitly generates intermediate steps before arriving at a conclusion (e.g., determining whether a transaction satisfies a SAR threshold, as in operation 370 of FIG. 3B). During training, an administrative user or the server 440 may generate training datasets comprising training data records that include relevant types of information about the substance of the system 400 (e.g., transaction information for particular transactions), the information referenced or needed to determine if the transaction meets the SAR criteria, and the final decision. The COT approach trains the RAG model to follow a logical sequence of thought by iteratively outputting predicted intermediate outputs, iteratively determining loss values based on expected intermediate values indicated by labelled data or user feedback. The loss function of the RAG model may adjust parameters or weights of the machine-learning model of the integration and reporting persona 406 based on the loss values computed for the intermediate and/or final loss values.

In some embodiments, the RAG engine 401 or other software components of the server 440 includes software programming or configurations defining one or more personas that may be implemented or invoked by the RAG engine 401 or the LLM 403. The programming and configurations for a particular persona may represent a set of attributes of the particular persona. Non-limiting examples of the persona attributes include knowledge domain expertise, behaviors or operations, and preferences, among other types of persona attributes that may be represented as preconfigured programming or configurations for the personas. As depicted in FIG. 4, non-limiting examples of the personas include a regulatory knowledge persona (regulatory persona 402), a database interaction persona (database persona 404), and an integration and reporting persona 406, though potential embodiments may include any number of additional or alternative types of personas. In some implementations, the machine-readable code of a persona may train and implement various types of machine-learning models for performing the programmed task(s) or operation(s) of the particular persona. As an example, the machine-readable code of a persona may implement a transformer-based machine-learning model, such as Generative Pre-Training Transformer (GPT) or Bidirectional Encoder Representations from Transformers (BERT), that the server 440 may fine-tune for the particular operations of the persona.

The regulatory persona 402 includes configurations and programming representing persona attributes indicating an expertise in certain regulatory knowledge domains. For instance, the regulatory persona 402 includes programming that behaves as though the regulatory persona 402 and the LLM 403 understands regulatory requirements and nuances associated with SARs and SAR filings. The regulatory persona 402 trains and executes a machine-learning model trained and tuned with knowledge of historical filings. In some implementations, the server 440 may train the regulatory persona 402 may with changes in SAR templates, SAR-related regulations, and detection or output thresholds, among other types of training datasets. Additionally or alternatively, in some implementations the server 440 and the regulatory persona 402 have access to recent documents or changes stored in one or more databases 410 by invoking the RAG 401 or invoking other personas in the RAG 401 (e.g., database person 404). The regulatory persona 402 may automatically or periodically generate and update the various SAR templates according to a set of recent or latest requirements. In some implementations, the regulatory persona 402 may provide guidance on when a transaction should be flagged based on regulatory thresholds. The regulatory persona 402 includes software programming that executes a series of sequential operations for querying databases 410 of relevant data sources, such as stored SAR templates, SAR outputs, and a knowledge domain corpus. The operations of the regulatory persona 402 may train, integrate, and invoke a machine-learning model component (periodic fine-tuning, RAG 401) to adapt to new regulations and historical data analysis for improving threshold settings.

The database persona 404 includes configurations and programming representing persona attributes indicating an expertise or behavior role in searching databases 410 of various data sources and managing interactions between the RAG engine 401 and the databases 410. For instance, the database persona 404 queries the databases 410 to extract various types of transaction data of a current or prior transactions and other types of information related to the transaction. The database persona 404 includes programming that queries any number of databases 410, understands the structure of the data in one or more databases 410, and extracts relevant data points needed for SAR generation. Non-limiting examples of the relevant data may include transaction details, customer profiles, and historical transaction patterns. In some implementations, the database persona 404 executes various querying techniques and may employ or invoke a machine learning model to improve data extraction based on the relevance to potential fraud scenarios.

The integration and reporting persona 406 includes configurations and programming representing persona attributes indicating an expertise in generating SARs using inputted data or prompt instructions. For instance, the integration and reporting persona 406 may serve or behave as a connecting logical bridge between the regulatory persona 402 and the database persona 404, completing the SAR template with required data. The integration and reporting persona 406 may ingest or synthesize the information outputted from other two personas (e.g., regulatory person 402, database person 404) or the LLM 403. The integration and reporting persona 406 is programmed or trained to complete the SAR template form file with accurate and compliant information, and finalizes the SAR report file for submission. The integration and reporting persona 406 may be implemented as a natural language generation system that formats and contextualizes the extracted data into a readable and compliant report.

As mentioned, the personas may include software programming for machine-learning models. In some configurations, the machine-learning model of a persona is a fine-tuned version of a RAG model of the RAG engine 401. In some configurations, the machine-learning model of a persona is a distinct machine-learning model configured for the particular persona.

The server 440 may obtain (e.g., generate, receive, retrieve) training datasets containing various types of data relative to the type of persona to be trained. As an example, the regulatory persona 402 may be trained using data records containing information in the regulatory knowledge domain, including regulations, updates to regulations, sample SAR filings, and threshold values for generating SARs, among others. As another example, the database persona 404 may be trained using data records containing information about prior substantive operations of the system 400 (e.g., prior transactions in financial system) and user profiles, among various types of historical data of the system 400 stored in the one or more databases 410. As another example, the integration and reporting persona 406 may be trained on samples or information indicating the types of information and/or formatting of the SAR content and files, such as samples of completed SAR forms and correct filings based on given sets of data.

In some implementations, the server 440 and the RAG engine 401 perform fine-tuning operations for the machine-learning model of the persona. The RAG engine 401 may train the machine-learning model of each persona on the respective training dataset with operations designed to emphasize the role of the particular persona. In some cases, the server 440 and/or the RAG engine 401 executes training functions for performing supervised learning that reference labelled examples showing the correct or expected outputs referenced by one or more loss functions to determine an amount of loss and tuning the weights or parameters of the machine-learning model of the persona based on the loss.

In some embodiments, the server 440 or RAG engine 401 perform joint training operations for jointly training multiple machine-learning models, such as the RAG model and/or and various persona machine-learning models. The RAG engine 401 trains the machine-learning models by executing training functions based on outputs of each machine-learning model of each persona and/or the RAG model. In some cases, the server 440 and/or the RAG engine 401 executes training functions for performing supervised learning that reference labelled examples showing the correct or expected outputs referenced by an integrated joint loss function to determine an amount of loss and tuning the weights or parameters of one or more machine-learning models of the personas or the RAG model based on the joint loss.

The server 440 and the RAG engine 401 may perform various processes for integration, deployment, and monitoring the functions and features of the LLM 403, the RAG engine 401, and/or the personas. In some embodiments, the server 440 performs integration operations that integrate the trained personas into a single, integrated functional system as an integrated machine-learning architecture. In the integrated embodiments, the machine-learning models of the personas may interact with one another by invoking and executing API calls between the persona models or invoking a unified jointly trained machine-learning model. In some embodiments, the server 440 may initially deploy the machine-learning architecture of the personas and RAG engine 401 in an isolated or controlled environment, such as an isolated virtual machine or sandbox, to monitor the performance of the machine-learning models and tweak the parameters of the machine-learning models as needed.

In some embodiments, the server 440 trains a machine-learning model for each type of persona and then merges the machine-learning models into a large unified or joint model, which may be a joint RAG model. The server 440 may execute software programming of one or more model-merging techniques or operations to generate the joint model for the personas, which may be used in addition or an alternative to various loss functions and/or tuning operations. As an example, the model-merging operations may include Spherical Linear Interpolation (SLERP) that blends or algorithmically combines the parameters or weights of the respective persona models along a high-dimensional sphere. As another example, the model-merging operations may include "frankenmerging" that algorithmically combines the operational layers of the machine-learning architectures of the various different machine-learning models of a number of personas. As another example, the model-merging operations may include Mixture of Experts (MoE) operations that routes inputs to specialized sub-models ("experts") of the integrated persona machine-learning models. As another example, the model-merging operations may include Task Vector Algorithms that determines and uses weight differences between a base machine-learning model and fine-tuned models.

Figure 5:
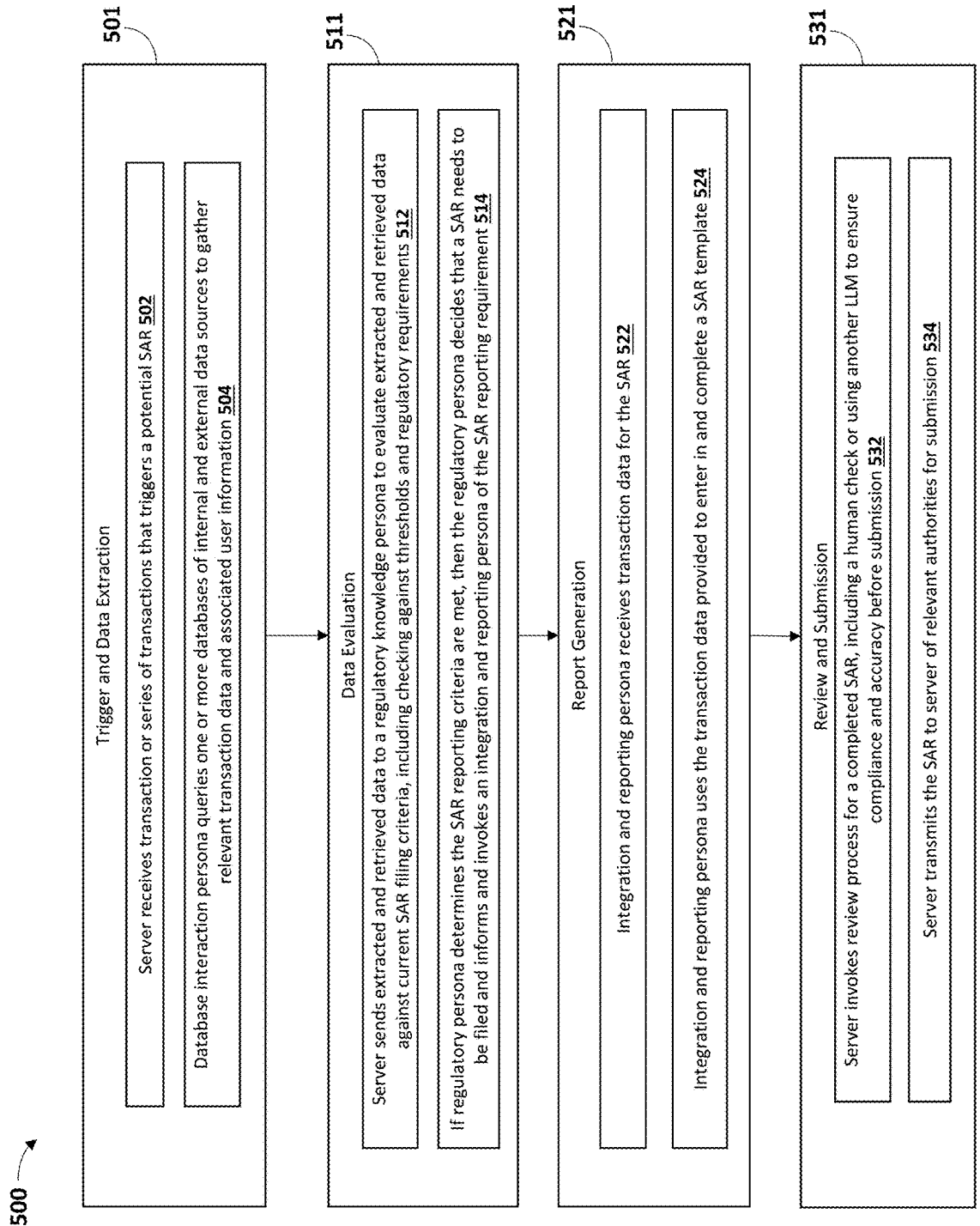
FIG. 5 shows operations of a method for generating SARs using LLMs and RAG models for the LLMs, in accordance with one or more embodiments.

FIG. 5 shows operations of a method 500 for generating SARs using LLMs and RAG models for the LLMs, according to an embodiment. The method 500 includes trigger and data extraction operations 501, data evaluation operations 511, report generation operations, and review and submission operations 531. Embodiments may include additional or alternative operations than those of the method 500 depicted in FIG. 5, and still fall within the scope of this disclosure. For ease of description and understanding, the method 500 is described as being performed by a server (e.g., server 340, 440), though embodiments are not so limited.

At the trigger and data extraction operations 501, the server obtains new transaction information for fraud analysis and potentially generating a machine-readable SAR. In operation 502, the server receives the transaction data for a transaction or set of two or more transactions that triggers the analysis for potentially generating the SAR. In operation 504, the server invokes or executes software programming of a database interaction persona ("database persona"). The database persona queries one or more databases of internal and external data sources to gather transaction data and associated user information relevant to analyzing the transaction. The database persona may be trained to query and retrieve data records or portions of data records containing certain types of data points.

At the data evaluation operations 511, the server computes a fraud risk score and determines whether to generate the SAR based on the risk score and a preconfigured reporting threshold value for the risk score. In operation 512, the server sends the transaction data to a regulatory knowledge persona ("regulatory persona"). The transaction data may include the various types of data extracted from the transaction message data received from the client device or other computing devices. The transaction data may further include various types of data retrieved from the one or more databases. The programming of the regulatory persona is configured and trained to evaluate the extracted and retrieved transaction data against current SAR filing criteria, including message updates indicating the reporting thresholds and/or regulatory content requirements for the types of data to include in a SAR and/or the formatting or structure of the data in the SAR or a SAR file. The regulatory persona or other component of the server may then generate a fraud risk score indicating a predicted likelihood of fraud associated with the transaction by applying a fraud prediction engine on a feature vector extracted from the various types of transaction data for the transaction. In operation 514, when the regulatory persona (or other component of the server) determines that the SAR reporting criteria are met (e.g., when the fraud risk score satisfies the reporting threshold value), then the regulatory persona determines that a SAR needs to be generated and filed. The regulatory persona (or other component of the server) then informs and invokes software routines containing operations for generating a machine-readable SAR, including the software programming of an integration and reporting persona.

At the report generation operations 521, software routines of the server, such as the integration and reporting persona, may generate the SAR in accordance with the SAR reporting requirement instructions or thresholds identified by the regulatory persona. In operation 522, the integration and reporting persona receives the various types of extracted and retrieved transaction data to include in the SAR, as indicated or determined by the regulatory persona. In operation 524, the integration and reporting persona uses the various types of transaction data provided to enter in and complete text or data fields of a SAR template, ensuring that the required info included according to the regulatory standards. The integration and reporting persona may invoke the LLM to generate and the form data and enter the form data in the SAR template, thereby generating a machine-readable SAR.

At the review and submission operations 531, the server performs functions to facilitate automatic or manual review of the SAR and submit the SAR to a server or other destination (e.g., URL) of an authority webservice. In operation 532, the server invokes software operations for a review process of the completed SAR, which may include presenting a human-readable format of the SAR at a graphical user interface and/or executing another LLM to determine an accuracy of the data fields in the SAR and/or compliance of the data fields relative to required data fields determined by the regulatory persona. In operation 534, the server submits the machine-readable SAR to the relevant authority. The server transmits the machine-readable SAR, as a data file or data stream, to the server or other destination (e.g., URL) of the authority webservice or device.

Figure 6:
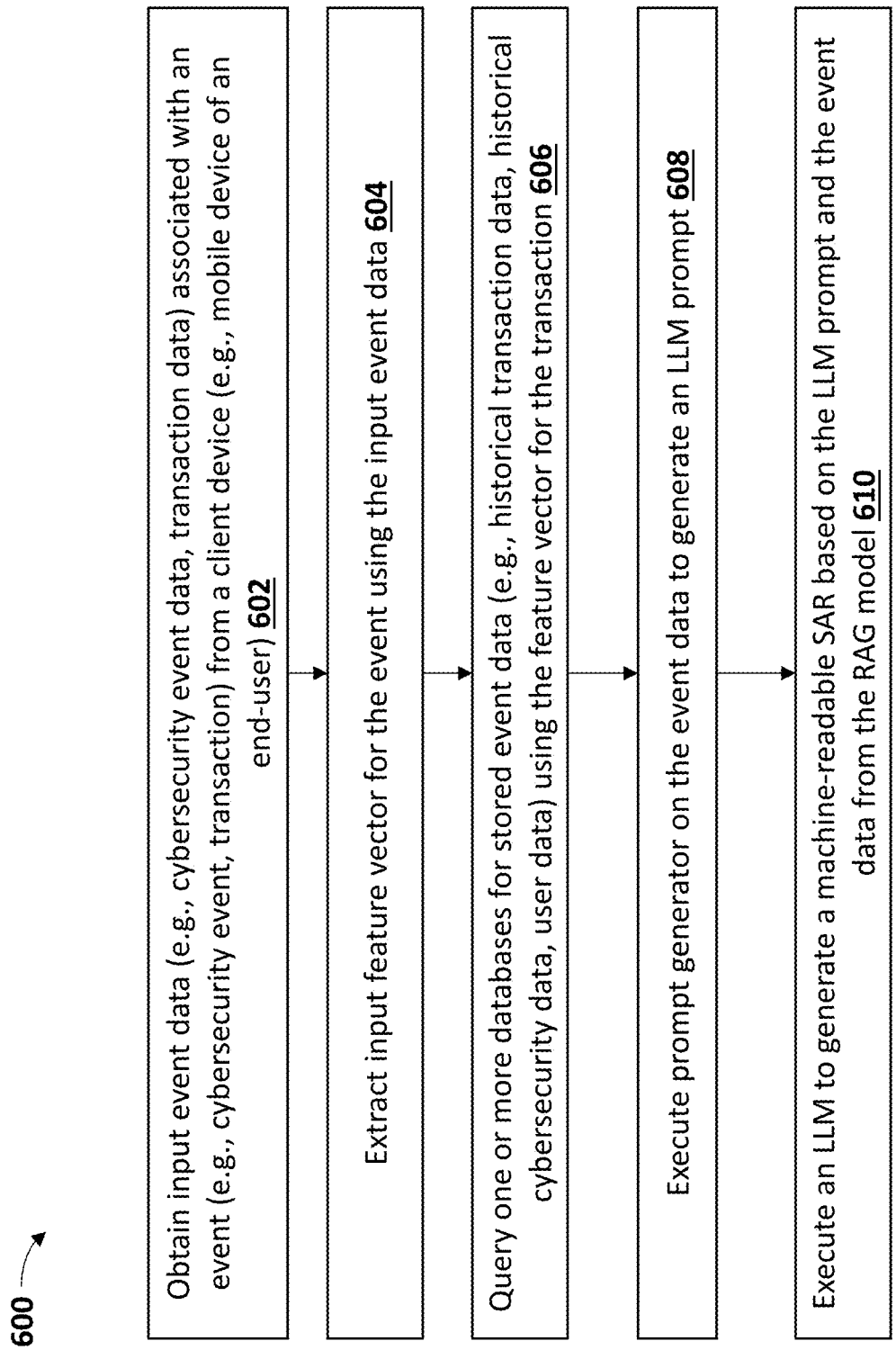
FIG. 6 shows operations of a method for generating machine-readable SARs (e.g., data files, data streams) using RAG engines and LLMs, in accordance with one or more embodiments.

FIG. 6 shows operations of a method 600 for generating machine-readable SARs (e.g., data files, data streams) using RAG engines and LLMs. Embodiments may include additional or alternative operations than those of the method 600 depicted in FIG. 6, and still fall within the scope of this disclosure. For ease of description and understanding, the method 600 is described as being performed by a server (e.g., server 340, 440), though embodiments are not so limited.

In operation 602, the server obtains input event data (e.g., cybersecurity event data, transaction) or other type of processing data associated with an event (e.g., cybersecurity event, transaction) from a client device (e.g., mobile device of an end-user). In operation 604, the server extracts an input feature vector for the event using the input event data.

In operation 606, the server queries one or more databases for stored event data (e.g., historical transaction data, historical cybersecurity data, user data) using the input feature vector for the event. The server may invoke and execute a RAG engine, which may include executing a RAG model. The server identifies and retrieves the stored event data that corresponds to a stored feature vector that is within a threshold distance from the input feature vector extracted for the input event data of the event. The server generates, retrieves, composites, and/or extracts the stored event data based upon the stored transaction data retrieved from the one or more databases and the input transaction data received and extracted from the client device, such that the server thereby obtains event data for the event based on the stored event data and the input event data.

In operation 608, the server executes a prompt generator on the event data to generate an LLM prompt for an LLM that generates the text inputs for the SAR outputs. The prompt generator is trained to receive the event data from the RAG model as input and generate an LLM prompt as output using the event data from the RAG model.

In operation 610, the server executes an LLM to generate a machine-readable SAR based on the LLM prompt from the prompt generator and the event data from the RAG model. The LLM is trained to receive the LLM prompt from the prompt generator as input and generate the machine-readable SAR as output using the LLM prompt and the event data. The machine-readable SAR contains at least a portion of the event data in accordance with the LLM prompt generated by the prompt generator.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

Some non-limiting embodiments of the present disclosure are described herein in connection with a threshold. As described herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open ended terms. Further, the phrase "based on" is intended to mean "based at least partially on" unless explicitly stated otherwise.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A non-transitory computer readable medium comprising instructions for improving cybersecurity over cloud computing networks by generating suspicious activity reports (SARs) using retrieval-augmented generation (RAG) and large language models (LLMs) that when executed by one or more processors cause operations comprising:

obtaining, over a cloud computing network, processing data associated with a cybersecurity event from a mobile device;

extracting an input feature vector for the cybersecurity event using the processing data;

querying, by executing a RAG model of a RAG engine, one or more databases for historical cybersecurity data using the input feature vector for the cybersecurity event, the historical cybersecurity data having a stored feature vector within a threshold distance from the input feature vector for the cybersecurity event, to composite cybersecurity event data based upon the historical cybersecurity data and the processing data;

executing a prompt generator on the composite cybersecurity event data, the prompt generator trained to receive the composite cybersecurity event data from the RAG model as input and generate an LLM prompt as a first output using the composite cybersecurity event data from the RAG model; and generating, by executing an LLM, a machine-readable SAR based on the composite cybersecurity event data from the RAG model, the LLM trained to receive the LLM prompt from the prompt generator as input and generate the machine-readable SAR as a second output using the LLM prompt and the composite cybersecurity event data, the machine-readable SAR containing at least a portion of the composite cybersecurity event data in accordance with the LLM prompt generated by the prompt generator.

2. A computer-implemented method for improving cybersecurity generating suspicious activity reports (SARs) using retrieval-augmented generation (RAG) and large language models (LLMs), the computer-implemented method comprising:

obtaining, by a computer, input event data associated with an event from a client device;

extracting, by the computer, an input feature vector for the event using the input event data;

querying, by the computer executing a RAG model of a RAG engine, one or more databases for stored event data using the input feature vector for the event, the stored event data having a stored feature vector within a threshold distance from the input feature vector for the event, thereby obtaining event data based upon the stored event data and the input event data;

executing, by the computer, a prompt generator on the event data, the prompt generator trained to receive the event data from the RAG model as input and generate an LLM prompt as output using the event data from the RAG model; and generating, by the computer executing an LLM, a machine-readable SAR based on the event data from the RAG model, the LLM trained to receive the LLM prompt from the prompt generator as input and generate the machine-readable SAR as output using the LLM prompt and the event data, the machine-readable SAR containing at least a portion of the event data in accordance with the LLM prompt generated by the prompt generator.

3. The method according to claim 2, further comprising receiving, by the computer, an alert indicating that the event is a candidate suspicious event, wherein the computer obtains the stored event data from the one or more databases in response to receiving the alert.

4. The method according to claim 2, further comprising:

identifying, by the computer executing a database persona of the RAG engine, the stored event data in the one or more databases; and extracting, by the computer, one or more types of data points from the stored event data according to one or more configurations of the database persona indicating the one or more types of data points.

5. The method according to claim 2, further comprising generating, by the computer, a fraud risk score indicating a predicted likelihood of fraud associated with the event by executing a fraud prediction engine using a feature vector extracted using the event data, wherein the computer executes the prompt generator in response to determining that the fraud risk score satisfies a reporting threshold score.

6. The method according to claim 2, further comprising obtaining, by the computer executing a regulatory persona of the RAG engine, an update message from a database of the one or more databases indicating a reporting threshold score.

7. The method according to claim 2, further comprising obtaining, by the computer executing a regulatory persona of the RAG engine, an update message from a database of the one or more databases indicating a content data type for content of the event data for the machine-readable SAR, wherein the LLM executed by the computer generates the machine-readable SAR based upon the content data type of the event data.

8. The method according to claim 7, further comprising generating, by the computer executing the regulatory persona of the RAG engine, a machine-readable template SAR file indicating the content data type, wherein the LLM executed by the computer generates the machine-readable SAR as the machine-readable template SAR file having the event data.

9. The method according to claim 2, wherein querying the stored event data associated with the event includes receiving, by the computer, user data associated with a user involved in the event from the one or more databases.

10. The method according to claim 2, further comprising generating, by the computer, a unified RAG model based upon a plurality of machine-learning models of a plurality of personas.

11. A system for improving cybersecurity by generating suspicious activity reports (SARs) using retrieval-augmented generation (RAG) and large language models (LLMs), the system comprising:

a computer comprising at least one processor, configured to:

obtain input event data associated with an event from a client device;

extract an input feature vector for the event using the input event data;

query, by a RAG model of a RAG engine, one or more databases for stored event data using the input feature vector for the event, the stored event data having a stored feature vector within a threshold distance from the input feature vector for the event, thereby obtaining event data based upon the stored event data and the input event data;

execute a prompt generator on the event data, the prompt generator trained to receive the event data from the RAG model as input and generate an LLM prompt as output using the event data from the RAG model; and execute an LLM to generate a machine-readable SAR based on the event data from the RAG model, the LLM trained to receive the LLM prompt from the prompt generator as input and generate the machine-readable SAR as output using the LLM prompt and the event data, the machine-readable SAR containing at least a portion of the event data in accordance with the LLM prompt generated by the prompt generator.

12. The system according to claim 11, wherein the computer is further configured to receive an alert indicating that the event is a candidate suspicious event, and wherein the computer obtains the stored event data from the one or more databases in response to receiving the alert.

13. The system according to claim 11, wherein the computer is further configured to:

identify, by executing a database persona of the RAG engine, the stored event data in the one or more databases; and extract one or more types of data points from the stored event data according to one or more configurations of the database persona indicating the one or more types of data points.

14. The system according to claim 11, wherein the computer is further configured to generate a fraud risk score indicating a predicted likelihood of fraud associated with the event by executing a fraud prediction engine using a feature vector extracted using the event data, and wherein the computer executes the prompt generator in response to determining that the fraud risk score satisfies a reporting threshold score.

15. The system according to claim 11, wherein the computer is further configured to obtain, by executing a regulatory persona of the RAG engine, an update message from a database of the one or more databases indicating a reporting threshold score.

16. The system according to claim 11, wherein the computer is further configured to obtain, by executing a regulatory persona of the RAG engine, an update message from a database of the one or more databases indicating a content data type for content of the event data for the machine-readable SAR, and wherein the LLM executed by the computer generates the machine-readable SAR based upon the content data type of the event data.

17. The system according to claim 16, wherein the computer is further configured to generate, by executing the regulatory persona of the RAG engine, a machine-readable template SAR file indicating the content data type, and wherein the LLM executed by the computer generates the machine-readable SAR as the machine-readable template SAR file having the event data.

18. The system according to claim 11, wherein when querying the stored event data associated with the event the computer is configured to receive user data associated with a user involved in the event from the one or more databases.

19. The system according to claim 11, wherein the computer is further configured to generate a unified RAG model based upon a plurality of machine-learning models of a plurality of personas.

20. The system according to claim 11, wherein the computer iteratively trains a persona machine-learning model of a persona using intermediate outputs iteratively generated by the persona machine-learning model in accordance with a chain-of-thought training.

* * * * *

UNITED STATES PATENT AND TRADEMARK OFFICE
CERTIFICATE OF CORRECTION

| | | |
|---|---|---|
| PATENT NO. | : 12,155,685 B1 | Page 1 of 1 |
| APPLICATION NO. | : 18/769872 | |
| DATED | : November 26, 2024 | |
| INVENTOR(S) | : Girish Wali et al. | |

It is certified that error appears in the above-identified patent and that said Letters Patent is hereby corrected as shown below:

On the Title Page

<u>Item (63)</u>
Please add the following:
"Related U.S. Application Data
(63) Continuation-in-part of application No. 18/524,468, filed on November 30, 2023."

Signed and Sealed this
Twenty-ninth Day of April, 2025

Coke Morgan Stewart
*Acting Director of the United States Patent and Trademark Office*